United States Patent
Kondo et al.

(10) Patent No.: US 9,267,020 B2
(45) Date of Patent: Feb. 23, 2016

(54) RUBBER COMPOSITION AND PNEUMATIC TIRE

(75) Inventors: Toshikazu Kondo, Kobe (JP); Jun Okamoto, Kobe (JP); Sakae Okubo, Kobe (JP); Ryoichi Kasahara, Kobe (JP); Kenji Murata, Kobe (JP); Kazuhiro Kodama, Kobe (JP); Kazuyuki Nishioka, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 388 days.

(21) Appl. No.: 13/323,426

(22) Filed: Dec. 12, 2011

(65) Prior Publication Data

US 2012/0149806 A1 Jun. 14, 2012

(30) Foreign Application Priority Data

Dec. 13, 2010 (JP) ................................. 2010-277117
Nov. 21, 2011 (JP) ................................. 2011-254174

(51) Int. Cl.

| C08L 7/00 | (2006.01) |
|---|---|
| C08L 63/08 | (2006.01) |
| C08L 9/00 | (2006.01) |
| C08L 9/06 | (2006.01) |
| C08L 15/00 | (2006.01) |
| C08L 19/00 | (2006.01) |
| C08L 21/00 | (2006.01) |
| C08K 3/04 | (2006.01) |
| C08K 3/36 | (2006.01) |
| C08C 19/22 | (2006.01) |
| C08C 19/25 | (2006.01) |
| B29D 30/00 | (2006.01) |

(52) U.S. Cl.
CPC . *C08L 7/00* (2013.01); *C08L 63/08* (2013.01); *C08L 2205/02* (2013.01); *C08L 2205/03* (2013.01)

(58) Field of Classification Search
CPC ... C08L 7/00; C08L 2205/02; C08L 2205/03; C08L 63/08; Y02T 10/862
USPC .......................................................... 523/438
See application file for complete search history.

(56) References Cited

U.S. PATENT DOCUMENTS

| 3,937,681 A | 2/1976 | Nordsiek |
|---|---|---|
| 4,836,262 A | 6/1989 | Nishizawa et al. |
| 5,189,109 A | 2/1993 | Imai et al. |
| 6,147,178 A | 11/2000 | Nakamura et al. |
| 6,294,624 B1 | 9/2001 | Inoue et al. |
| 6,590,017 B1 | 7/2003 | Hergenrother et al. |
| 2002/0011293 A1 | 1/2002 | Zanzig et al. |
| 2004/0152845 A1 | 8/2004 | Oshima et al. |
| 2004/0254301 A1 | 12/2004 | Tsukimawashi et al. |
| 2005/0119399 A1 | 6/2005 | Nishioka et al. |
| 2005/0209390 A1* | 9/2005 | Yagi et al. ...................... 524/493 |
| 2005/0272852 A1 | 12/2005 | Sandstrom et al. |
| 2006/0173118 A1 | 8/2006 | Hochi et al. |
| 2007/0123636 A1 | 5/2007 | Hattori et al. |
| 2007/0149688 A1 | 6/2007 | Hochi |
| 2007/0167557 A1 | 7/2007 | Dumke et al. |
| 2008/0027166 A1 | 1/2008 | Hochi et al. |
| 2009/0176910 A1 | 7/2009 | Anbe et al. |
| 2009/0247692 A1* | 10/2009 | Oshima et al. ................. 524/547 |
| 2010/0056703 A1 | 3/2010 | Oshima |
| 2010/0056709 A1* | 3/2010 | Oshima .......................... 524/571 |
| 2010/0056710 A1 | 3/2010 | Oshima |
| 2010/0056712 A1 | 3/2010 | Oshima |
| 2010/0056713 A1* | 3/2010 | Oshima .......................... 524/572 |
| 2010/0099795 A1 | 4/2010 | Uesaka |
| 2010/0108213 A1* | 5/2010 | Miyazaki ..................... 152/209.5 |
| 2010/0113683 A1 | 5/2010 | Matsumoto et al. |
| 2010/0144954 A1 | 6/2010 | Kikuchi et al. |
| 2010/0184908 A1 | 7/2010 | Kikuchi et al. |
| 2012/0016056 A1 | 1/2012 | Miyazaki |
| 2012/0149806 A1 | 6/2012 | Kondo et al. |

FOREIGN PATENT DOCUMENTS

| CN | 1578790 A | 2/2005 |
|---|---|---|
| CN | 1670062 A | 9/2005 |

(Continued)

OTHER PUBLICATIONS

Heisler, "Advanced Vehicle Technology", Elsevier, 2nd edition, 2002, pp. 281-282.

(Continued)

*Primary Examiner* — Randy Gulakowski
*Assistant Examiner* — Ha Nguyen
(74) *Attorney, Agent, or Firm* — Birch Stewart Kolasch & Birch LLP

(57) ABSTRACT

A rubber composition that can improve in good balance the fuel economy, wet-grip performance, and abrasion resistance, and a pneumatic tire that uses this rubber composition are provided. This rubber composition contains a rubber component, and carbon black and/or silica, wherein based on 100% by mass of the rubber component, the rubber component contains 5 to 50% by mass of natural rubber, 0.3 to 10% by mass of an epoxidized natural rubber, and at least 5% by mass of a conjugated diene polymer that has a constituent unit based on a conjugated diene and a constituent unit represented by formula (I) below, at least one terminal of the polymer being modified, and wherein a total content of the carbon black and the silica is 3 to 100 parts by mass per 100 parts by mass of the rubber component.

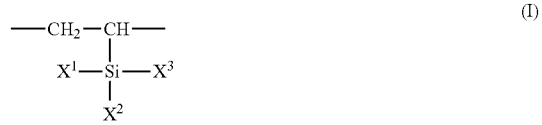

(I)

3 Claims, No Drawings

(56) References Cited

FOREIGN PATENT DOCUMENTS

| | | |
|---|---|---|
| CN | 1821293 A | 8/2006 |
| CN | 101360784 A | 2/2009 |
| CN | 101659728 A | 3/2010 |
| CN | 101659729 A | 3/2010 |
| CN | 101659731 A | 3/2010 |
| CN | 101659732 A | 3/2010 |
| CN | 101671418 A | 3/2010 |
| EP | 0 042 481 A1 | 12/1981 |
| EP | 0493364 A2 | 7/1992 |
| EP | 1075967 A1 | 2/2001 |
| EP | 2062620 A1 | 5/2009 |
| EP | 2098564 A1 | 9/2009 |
| EP | 2 196 324 A1 | 6/2010 |
| JP | 1-217047 A | 8/1989 |
| JP | 4-77536 A | 3/1992 |
| JP | 5-214170 A | 8/1993 |
| JP | 2000-344955 A | 12/2000 |
| JP | 2003-192842 A | 7/2003 |
| JP | 2003-533574 A | 11/2003 |
| JP | 2005-213486 A | 8/2005 |
| JP | 2005-263956 A | 9/2005 |
| JP | 2006-233177 A | 9/2006 |
| JP | 2007-177209 A | 7/2007 |
| JP | 2007-197671 A | 8/2007 |
| JP | 2008-50570 A | 3/2008 |
| JP | 2008/101127 A | 5/2008 |
| JP | 2008-150435 A | 7/2008 |
| JP | 2008-280438 A | 11/2008 |
| JP | 2009-91482 A | 4/2009 |
| JP | 2009-114262 A | 5/2009 |
| JP | 2009-126907 A | 6/2009 |
| JP | 2010-77412 A | 4/2010 |
| JP | 2010-77413 A | 4/2010 |
| JP | 2010-77414 A | 4/2010 |
| JP | 2010-77415 A | 4/2010 |
| JP | 2010-116556 A | 5/2010 |
| JP | 2010-215832 A | 9/2010 |
| JP | 2010-270292 A | 12/2010 |
| WO | WO 2007/081018 A1 | 7/2007 |

OTHER PUBLICATIONS

International Search Report (Form PCT/ISA/210) for International Application No. PCT/JP2011/066689, dated Aug. 16, 2011.
International Search Report (Form PCT/ISA/210) for International Application No. PCT/JP2012/057498, dated Jun. 19, 2012.
International Search Report (Form PCT/ISA/210) for International Application No. PCT/JP2012/060342, dated Jul. 17, 2012.
International Search Report (Form PCT/ISA/210) for International Application No. PCT/JP2012/060658, dated Jul. 24,2012.
International Search Report (Form PCT/ISA/210) for International Application No. PCT/JP2012/061345, dated Aug. 7, 2012, with an English translation.
U.S. Office Action for U.S. Appl. No. 13/700,300, dated Aug. 4, 2014.
U.S. Office Action for U.S. Appl. No. 13/700,300, dated Mar. 20, 2014.
U.S. Office Action for U.S. Appl. No. 13/700,300, dated Oct. 22, 2014.
U.S. Office Action for U.S. Appl. No. 13/982,160, dated Mar. 5, 2015.
U.S. Office Action for U.S. Appl. No. 14/005,781, dated Aug. 29, 2014.
ASTM International, "Standard Test Method for Precipitated Silica-Surface Area by Multipoint BET Nitrogen Adsorption," ASTM D1993-03(2013), Book of Standards, vol. 09.01, 2013, pp. 1-2 (http://www.astm.org/Standards/D1993.htm).
International Search Report (Form PCT/ISA/210) for International Application No. PCT/JP2011/066700, dated Oct. 18, 2011.
U.S. Office Action for U.S. Appl. No. 13/701,366, dated Mar. 23, 2015.

* cited by examiner

RUBBER COMPOSITION AND PNEUMATIC TIRE

TECHNICAL FIELD

The present invention relates to a rubber composition and a pneumatic tire produced using the rubber composition.

BACKGROUND ART

The demands on automobiles for better fuel economy have been increasing in recent years as concern with environmental issues has been rising, and good fuel economy is also being required of the rubber compositions used for automotive tires. For example, rubber compositions containing a conjugated diene polymer (e.g., polybutadiene, butadiene-styrene copolymer, and so forth) and a filler (e.g., carbon black, silica, and so forth) are used for the rubber compositions for automotive tires.

An example of a method for improving the fuel economy is provided in Patent Document 1; this method uses a diene rubber that has been modified by an organosilicon compound that contains an amino group and alkoxy group. However, there has been demand in recent years for additional improvements in fuel economy. Wet-grip performance and abrasion resistance are also properties required of the rubber compositions used for automotive tires; however, these properties generally assume an inverse relationship with the fuel economy and it has been difficult to obtain these individual properties in good balance at high property levels.

Patent Document 1: JP 2000-344955 A

SUMMARY OF THE INVENTION

An object of the present invention is to solve the problems identified above by providing a rubber composition that exhibits a well-balanced improvement in fuel economy, wet-grip performance, and abrasion resistance and by providing a pneumatic tire that uses the rubber composition.

The present invention relates to a rubber composition containing a rubber component, and carbon black and/or silica, wherein based on 100% by mass of the rubber component, the rubber component contains 5 to 50% by mass of natural rubber, 0.3 to 10% by mass of an epoxidized natural rubber, and at least 5% by mass of a conjugated diene polymer that has a constituent unit based on a conjugated diene and a constituent unit represented by formula (I) below, at least one terminal of the polymer being modified, and wherein a total content of the carbon black and the silica is 3 to 100 parts by mass per 100 parts by mass of the rubber component:

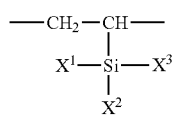
(I)

(wherein, $X^1$, $X^2$, and $X^3$ each independently represent a group represented by formula (Ia) below, a hydroxyl group, a hydrocarbyl group, or a substituted hydrocarbyl group, and at least one of $X^1$, $X^2$, and $X^3$ is a group represented by formula (Ia) or a hydroxyl group)

(Ia)

(wherein, $R^1$ and $R^2$ each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom).

$R^1$ and $R^2$ in formula (Ia) are preferably $C_{1-6}$ hydrocarbyl groups.

Two of $X^1$, $X^2$, and $X^3$ in formula (I) are preferably selected from a hydroxyl group and a group represented by formula (Ia).

The vinyl bond content in the aforementioned conjugated diene polymer is from at least 10 mol % to not more than 80 mol % per 100 mol % of the constituent unit based on a conjugated diene.

The present invention further relates to a pneumatic tire produced using the rubber composition described above.

The present invention, because it is a rubber composition that incorporates prescribed amounts of natural rubber, an epoxidized natural rubber, a specific conjugated diene polymer, and carbon black and/or silica, can provide a pneumatic tire in which the fuel economy, wet-grip performance, and abrasion resistance are improved in good balance.

BEST MODE FOR CARRYING OUT THE INVENTION

The rubber composition of the present invention contains natural rubber (NR), an epoxidized natural rubber (ENR), a conjugated diene polymer that has a constituent unit based on a conjugated diene and a constituent unit represented by formula (I) below wherein at least one terminal of the polymer has been modified, and carbon black and/or silica:

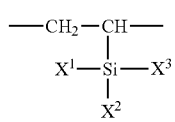
(I)

(in the formula, $X^1$, $X^2$, and $X^3$ each independently represent a group represented by formula (Ia) below, a hydroxyl group, a hydrocarbyl group, or a substituted hydrocarbyl group, and at least one of $X^1$, $X^2$, and $X^3$ is a group represented by formula (Ia) or a hydroxyl group)

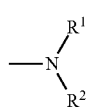
(Ia)

(in the formula, $R^1$ and $R^2$ each independently represent a hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom).

The conjugated diene for the conjugated diene-based constituent unit can be exemplified by 1,3-butadiene, isoprene, 1,3-pentadiene, 2,3-dimethyl-1,3-butadiene, 1,3-hexadiene, and so forth, and one of these or two or more may be used. 1,3-butadiene and isoprene are preferred from the standpoint of ease of availability.

$X^1$, $X^2$, and $X^3$ in formula (I) in the constituent unit represented by formula (I) each independently represent a group represented by formula (Ia), a hydroxyl group, a hydrocarbyl group, or a substituted hydrocarbyl group, and at least one of $X^1$, $X^2$, and $X^3$ is a group represented by formula (Ia) or a hydroxyl group.

$R^1$ and $R^2$ in formula (Ia) each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom.

As used herein, the term "hydrocarbyl group" denotes a hydrocarbon residue. This hydrocarbon residue refers to a monovalent group provided by the removal of hydrogen from a hydrocarbon. The term "substituted hydrocarbyl group" denotes a group provided by the substitution of one or more hydrogen atoms on a hydrocarbon residue with substituent groups. The term "hydrocarbyloxy group" denotes a group provided by substituting the hydrogen atom on a hydroxyl group with a hydrocarbyl group, while the term "substituted hydrocarbyloxy group" denotes a group provided by substituting one or more hydrogen atoms in a hydrocarbyloxy group with substituent groups. The term "substituted silyl group" denotes a group provided by substituting one or more hydrogen atoms in a silyl group with substituent groups.

The $C_{1-6}$ hydrocarbyl group encompassed by $R^1$ and $R^2$ can be exemplified by alkyl groups such as methyl, ethyl, n-propyl, isopropyl, n-butyl, sec-butyl, tert-butyl, n-pentyl, neopentyl, isopentyl, and n-hexyl; cycloalkyl groups such as cyclohexyl; and a phenyl group.

The $C_{1-6}$ substituted hydrocarbyl group encompassed by $R^1$ and $R^2$ can be exemplified by substituted hydrocarbyl groups having as a substituent at least one type of group selected from the group consisting of nitrogen atom-bearing groups, oxygen atom-bearing groups, and silicon atom-bearing groups.

The groups having a nitrogen atom-bearing group as a substituent can be exemplified by dialkylaminoalkyl groups such as dimethylaminoethyl and diethylaminoethyl; the groups having an oxygen atom-bearing group as a substituent can be exemplified by alkoxyalkyl groups such as methoxymethyl, methoxyethyl, ethoxymethyl, and ethoxyethyl; and the groups having a silicon atom-bearing group as a substituent can be exemplified by trialkylsilylalkyl groups such as trimethylsilylmethyl.

The substituted silyl group encompassed by $R^1$ and $R^2$ can be exemplified by trialkylsilyl groups such as trimethylsilyl, triethylsilyl, and t-butyldimethylsilyl.

Groups in which $R^1$ and $R^2$ are bonded to each other can be exemplified by $C_{1-12}$ divalent groups optionally having at least one type of atom selected from the group of atoms consisting of a nitrogen atom, oxygen atom, and silicon atom. Examples thereof include alkylene groups such as trimethylene, tetramethylene, pentamethylene, and hexamethylene; oxydialkylene groups such as oxydiethylene and oxydipropylene; and nitrogenous groups such as the group represented by —$CH_2CH_2$—NH—$CH_2$— and the group represented by —$CH_2CH_2$—N=CH—.

The group in which $R^1$ and $R^2$ are bonded to each other is preferably a nitrogenous group and more preferably the group represented by —$CH_2CH_2$—NH—$CH_2$— or the group represented by —$CH_2CH_2$—N=CH—.

The hydrocarbyl group for $R^1$ and $R^2$ is preferably an alkyl group, with a $C_{1-4}$ alkyl group being more preferred and methyl, ethyl, n-propyl, and n-butyl groups being even more preferred and ethyl and n-butyl groups being particularly preferred. The substituted hydrocarbyl group for $R^1$ and $R^2$ is preferably an alkoxyalkyl group and more preferably a $C_{1-4}$ alkoxyalkyl group. The substituted silyl group for $R^1$ and $R^2$ is preferably a trialkylsilyl group and more preferably a trimethylsilyl group.

$R^1$ and $R^2$ are, independently, preferably an alkyl, alkoxyalkyl, or substituted silyl, or are a nitrogenous group in which $R^1$ and $R^2$ are bonded to each other, and are, independently, more preferably an alkyl, even more preferably a $C_{1-4}$ alkyl, and yet more preferably methyl, ethyl, n-propyl, or n-butyl.

The group given by formula (Ia) may be an acyclic amino group or a cyclic amino group.

The acyclic amino group can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino; di(alkoxyalkyl)amino groups such as di(methoxymethyl)amino, di(methoxyethyl)amino, di(ethoxymethyl)amino, and di(ethoxyethyl)amino; and di(trialkylsilyl)amino groups such as di(trimethylsilyl)amino and di(t-butyldimethylsilyl)amino.

The cyclic amino group can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino. The cyclic amino group can also be exemplified by 1-imidazolyl, 4,5-dihydro-1-imidazolyl, 1-imidazolidinyl, 1-piperazinyl, and morpholino.

Viewed from the perspective of economics and ease of availability, the group represented by formula (Ia) is preferably an acyclic amino group, more preferably a dialkylamino group, even more preferably a dialkylamino group which is substituted by a $C_{1-4}$ alkyl, and yet more preferably dimethylamino, diethylamino, di(n-propyl)amino, or di(n-butyl)amino.

The hydrocarbyl group encompassed by $X^1$, $X^2$, and $X^3$ in formula (I) can be exemplified by alkyl groups such as methyl, ethyl, n-propyl, isopropyl, n-butyl, sec-butyl, and tert-butyl. The substituted hydrocarbyl group can be exemplified by alkoxyalkyl groups such as methoxymethyl, ethoxymethyl, methoxyethyl, and ethoxyethyl.

The hydrocarbyl group for $X^1$, $X^2$, and $X^3$ is preferably an alkyl group, more preferably a $C_{1-4}$ alkyl group, and even more preferably a methyl or ethyl group. The substituted hydrocarbyl group for $X^1$, $X^2$, and $X^3$ is preferably an alkoxyalkyl group and more preferably a $C_{1-4}$ alkoxyalkyl group.

With respect to the hydrocarbyl group and substituted hydrocarbyl group for $X^1$, $X^2$, and $X^3$, an alkyl or alkoxyalkyl is preferred; a $C_{1-4}$ alkyl or $C_{1-4}$ alkoxyalkyl is more preferred; a $C_{1-4}$ alkyl is even more preferred; and a methyl or ethyl group is yet more preferred.

At least one of $X^1$, $X^2$, and $X^3$ in formula (I) is a hydroxyl group or a group represented by formula (Ia). Preferably at least two of $X^1$, $X^2$, and $X^3$ in formula (I) are, independently, a hydroxyl group or a group represented by formula (Ia), and more preferably two of $X^1$, $X^2$, and $X^3$ in formula (I) are, independently, a hydroxyl group or a group represented by formula (Ia). Viewed from the standpoint of obtaining fuel economy, wet-grip performance, and abrasion resistance in good balance and at high levels, preferably at least one of $X^1$, $X^2$, and $X^3$ is a hydroxyl group, more preferably at least two of $X^1$, $X^2$, and $X^3$ are hydroxyl groups, and even more preferably two of $X^1$, $X^2$, and $X^3$ are hydroxyl groups.

Viewed from the perspective of increasing the fuel economy, wet-grip performance, and abrasion resistance in good balance, the constituent unit represented by formula (I) is preferably a constituent unit in which two of $X^1$, $X^2$, and $X^3$ are, independently, an acyclic amino group or a hydroxyl group. The constituent unit in which two of $X^1$, $X^2$, and $X^3$ are acyclic amino groups is preferably a bis(dialkylamino)alkylvinylsilane unit and is more preferably a bis(dimethylamino)methylvinylsilane unit, bis(diethylamino)methylvinylsilane unit, bis(di(n-propyl)amino)methylvinylsilane unit, or bis(di(n-butyl)amino)methylvinylsilane unit. The constituent unit in which two of $X^1$, $X^2$, and $X^3$ are hydroxyl groups is preferably a dihydroxyalkylvinylsilane unit and more preferably a dihydroxymethylvinylsilane unit.

The content of the constituent unit represented by formula (I) in the conjugated diene polymer, viewed from the perspective of increasing the fuel economy, wet-grip performance, and abrasion resistance in good balance, is preferably, expressed per unit mass of the polymer, from at least 0.001 mmol/g-polymer to not more than 0.1 mmol/g-polymer. From at least 0.002 mmol/g-polymer to not more than 0.07 mmol/g-polymer is more preferred. From at least 0.003 mmol/g-polymer to not more than 0.05 mmol/g-polymer is even more preferred.

At least one terminal of the conjugated diene polymer is modified by a modifying agent. From the standpoint of generating interaction with the silica or carbon black, the modifying agent is preferably a modifying agent that has a functional group that contains at least one selection from the group consisting of a nitrogen atom, oxygen atom, and silicon atom.

Suitable examples of the modifying agent are compounds with the following formula (II) (modifying agent 1):

(in the formula, n represents an integer from 1 to 10; $R^3$, $R^4$, and $R^5$ each independently represent a $C_{1-4}$ hydrocarbyl group or a $C_{1-4}$ hydrocarbyloxy group; at least one of $R^3$, $R^4$, and $R^5$ is a hydrocarbyloxy group; and $A^1$ represents a nitrogen atom-bearing functional group).

$R^3$, $R^4$, and $R^5$ in formula (II) each independently represent a $C_{1-4}$ hydrocarbyl group or a $C_{1-4}$ hydrocarbyloxy group, and at least one of $R^3$, $R^4$, and $R^5$ is a hydrocarbyloxy group.

The hydrocarbyl group encompassed by $R^3$, $R^4$, and $R^5$ can be exemplified by alkyl groups such as methyl, ethyl, n-propyl, isopropyl, n-butyl, sec-butyl, and tert-butyl. The hydrocarbyloxy group encompassed by $R^3$, $R^4$, and $R^5$ can be exemplified by alkoxy groups such as methoxy, ethoxy, n-propoxy, isopropoxy, n-butoxy, sec-butoxy, and t-butoxy.

The hydrocarbyl group for $R^3$, $R^4$, and $R^5$ is preferably an alkyl group and more preferably a $C_{1-3}$ alkyl group and even more preferably a methyl or ethyl group. The hydrocarbyloxy group for $R^3$, $R^4$, and $R^5$ is preferably an alkoxy group and more preferably a $C_{1-3}$ alkoxy group and even more preferably a methoxy or ethoxy group.

Viewing $R^3$, $R^4$, and $R^5$ from the perspective of increasing the fuel economy, wet-grip performance, and abrasion resistance in good balance, preferably at least two of $R^3$, $R^4$, and $R^5$ are hydrocarbyloxy groups, and more preferably the three of $R^3$, $R^4$, and $R^5$ are hydrocarbyloxy groups.

n in formula (II) represents an integer from 1 to 10. Viewed from the perspective of increasing the fuel economy, wet-grip performance, and abrasion resistance in good balance, n is preferably at least 3; viewed from the perspective of improving the economics, n is preferably not more than 4. n is particularly preferably 3.

$A^1$ in formula (II) is a nitrogen atom-bearing functional group and can be exemplified by amino, isocyano, cyano, pyridyl, piperidyl, pyrazinyl, morpholino, and so forth.

Groups represented by the following formula (IIa) are preferred for $A^1$:

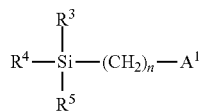

(in the formula, $R^6$ and $R^7$ each independently represent a $C_{1-6}$ group optionally having at least one type of atom selected from the group of atoms consisting of a nitrogen atom, oxygen atom, and silicon atom; $R^6$ and $R^7$ may be bonded to each other to form a cyclic structure together with the nitrogen atom; and $R^6$ and $R^7$ may be a single group bonded to the nitrogen by a double bond).

The $R^6$ and $R^7$ in formula (IIa) can be exemplified by $C_{1-6}$ hydrocarbyl groups, $C_{1-6}$ substituted hydrocarbyl groups, and substituted silyl groups.

The hydrocarbyl group for $R^6$ and $R^7$ can be exemplified by alkyl groups such as methyl, ethyl, n-propyl, isopropyl, n-butyl, sec-butyl, tert-butyl, n-pentyl, neopentyl, isopentyl, and n-hexyl; cycloalkyl groups such as cyclohexyl; and a phenyl group.

The substituted hydrocarbyl group for $R^6$ and $R^7$ can be exemplified by substituted hydrocarbyl groups that have as a substituent at least one type of group selected from the group consisting of nitrogen atom-bearing groups, oxygen atom-bearing groups, and silicon atom-bearing groups. The groups that have a nitrogen atom-bearing group as a substituent can be exemplified by dialkylaminoalkyl groups such as dimethylaminoethyl and diethylaminoethyl groups. The groups that have an oxygen atom-bearing group as a substituent can be exemplified by alkoxyalkyl groups such as methoxymethyl, methoxyethyl, ethoxymethyl, and ethoxyethyl; alkylene oxide groups such as epoxy and tetrahydrofuranyl; and alkylene oxide alkyl groups such as glycidyl and tetrahydrofurfuryl. The groups that have a silicon atom-bearing group as a substituent can be exemplified by trialkylsilylalkyl groups such as trimethylsilylmethyl.

As used herein, the term "alkylene oxide group" denotes a monovalent group provided by removing a hydrogen atom from the ring of a cyclic ether compound, while the term "alkylene oxide alkyl group" denotes a group provided by substituting at least one hydrogen atom in an alkyl group with an alkylene oxide group.

The substituted silyl group for $R^6$ and $R^7$ can be exemplified by trialkylsilyl groups such as trimethylsilyl, triethylsilyl, and t-butyldimethylsilyl, and trialkoxysilyl groups such as trimethoxysilyl.

Groups in which $R^6$ and $R^7$ are bonded to each other can be exemplified by $C_{2-12}$ divalent groups optionally having at least one type of atom selected from the group of atoms consisting of a nitrogen atom, oxygen atom, and silicon atom. Examples thereof include alkylene groups such as trimethylene, tetramethylene, pentamethylene, and hexamethylene; oxydialkylene groups such as oxydiethylene and oxydipropylene; and nitrogenous groups such as the group represented by —CH$_2$CH$_2$—NH—CH$_2$— and the group represented by —CH$_2$CH$_2$—N=CH—.

The group in which R$^6$ and R$^7$ are bonded to each other is preferably a nitrogenous group and more preferably the group represented by —CH$_2$CH$_2$—NH—CH$_2$— or the group represented by —CH$_2$CH$_2$—N=CH—.

The single group bonded to the nitrogen by a double bond and encompassed by R$^6$ and R$^7$ can be exemplified by C$_{2-12}$ divalent groups optionally having at least one type of atom selected from the group of atoms consisting of a nitrogen atom, oxygen atom, and silicon atom. Examples thereof include an ethylidene group, 1-methylpropylidene group, 1,3-dimethylbutylidene group, 1-methylethylidene group, and 4-N,N-dimethylaminobenzylidene group.

The hydrocarbyl group for R$^6$ and R$^7$ is preferably an alkyl group; more preferably a C$_{1-4}$ alkyl group; even more preferably a methyl, ethyl, n-propyl, or n-butyl group; and yet more preferably a methyl or ethyl group. The substituted hydrocarbyl group for R$^6$ and R$^7$ is preferably an alkoxyalkyl group, alkylene oxide group, or alkylene oxide alkyl group. The substituted silyl group for R$^6$ and R$^7$ is preferably a trialkylsilyl group or trialkoxysilyl group, more preferably a trialkylsilyl group, and even more preferably a trimethylsilyl or triethylsilyl group.

R$^6$ and R$^7$ are preferably a nitrogenous group in which R$^6$ and R$^7$ are bonded to each other, or are, independently, preferably an alkyl group, an alkoxyalkyl group, an alkylene oxide group, an alkylene oxide alkyl group, or a substituted silyl group and more preferably an alkyl group, alkylene oxide group, alkylene oxide alkyl group, or trialkylsilyl group.

The group represented by formula (IIa) can be exemplified by acyclic amino groups and cyclic amino groups.

The acyclic amino group can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino; di(alkoxyalkyl)amino groups such as di(methoxymethyl)amino, di(methoxyethyl)amino, di(ethoxymethyl)amino, and di(ethoxyethyl)amino; and di(trialkylsilyl)amino groups such as di(trimethylsilyl)amino and di(t-butyldimethylsilyl)amino. Other examples are di(alkylene oxide)amino groups such as di(epoxy)amino and di(tetrahydrofuranyl)amino; and di(alkylene oxide alkyl) amino groups such as di(glycidyl)amino and di(tetrahydrofurfuryl)amino.

Additional examples are an ethylideneamino group, 1-methylpropylideneamino group, 1,3-dimethylbutylideneamino group, 1-methylethylideneamino group, and 4-N,N-dimethylaminobenzylideneamino group.

As used herein, the term "di(alkylene oxide)amino group" denotes an amino group in which two hydrogen atoms bonded to the nitrogen atom are substituted by two alkylene oxide groups, while the term "di(alkylene oxide alkylamino group" denotes an amino group in which two hydrogen atoms bonded to the nitrogen atom are substituted by two alkylene oxide alkyl groups.

The cyclic amino group can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino. The cyclic amino group can also be exemplified by 1-imidazolyl, 4,5-dihydro-1-imidazolyl, 1-imidazolidinyl, 1-piperazinyl, and morpholino.

Viewed from the perspective of the fuel economy, wet-grip performance, abrasion resistance, and long-term stability and easy availability of the compound, the group represented by formula (IIa) is preferably an acyclic amino group and is more preferably a dialkylamino group, di(alkylene oxide)amino group, di(alkylene oxide alkyl)amino group, or di(trialkylsilyl)amino group.

The compound represented by formula (II) can be exemplified by compounds in which formula (IIa) is an acyclic amino group such as a dialkylamino group, di(alkoxyalkyl) amino group, di(alkylene oxide)amino group, di(alkylene oxide alkylamino group, or trialkylsilyl group.

The compound in which formula (IIa) is a dialkylamino group can be exemplified by the following:
[3-(dialkylamino)propyl]trialkoxysilanes such as
[3-(dimethylamino)propyl]trimethoxysilane,
[3-(diethylamino)propyl]trimethoxysilane,
[3-(ethylmethylamino)propyl]trimethoxysilane,
[3-(dimethylamino)propyl]triethoxysilane,
[3-(diethylamino)propyl]triethoxysilane, and
[3-(ethylmethylamino)propyl]triethoxysilane;
[3-(dialkylamino)propyl]alkyldialkoxysilanes such as
[3-(dimethylamino)propyl]methyldimethoxysilane,
[3-(diethylamino)propyl]methyldimethoxysilane,
[3-(ethylmethylamino)propyl]methyldimethoxysilane,
[3-(dimethylamino)propyl]ethyldimethoxysilane,
[3-(diethylamino)propyl]ethyldimethoxysilane,
[3-(ethylmethylamino)propyl]ethyldimethoxysilane,
[3-(dimethylamino)propyl]methyldiethoxysilane,
[3-(diethylamino)propyl]methyldiethoxysilane,
[3-(ethylmethylamino)propyl]methyldiethoxysilane,
[3-(dimethylamino)propyl]ethyldiethoxysilane,
[3-(diethylamino)propyl]ethyldiethoxysilane, and
[3-(ethylmethylamino)propyl]ethyldiethoxysilane; and
[3-(dialkylamino)propyl]dialkylalkoxysilanes such as
[3-(dimethylamino)propyl]dimethylmethoxysilane,
[3-(diethylamino)propyl]dimethylmethoxysilane,
[3-(dimethylamino)propyl]diethylmethoxysilane,
[3-(diethylamino)propyl]diethylmethoxysilane,
[3-(dimethylamino)propyl]dimethylethoxysilane,
[3-(diethylamino)propyl]dimethylethoxysilane,
[3-(dimethylamino)propyl]diethylethoxysilane, and
[3-(diethylamino)propyl]diethylethoxysilane.

The compound in which formula (IIa) is a di(alkoxyalkyl) amino group can be exemplified by the following:
{3-[di(alkoxyalkyl)amino]propyl}trialkoxysilanes such as
{3-[di(methoxymethyl)amino]propyl}trimethoxysilane,
{3-[di(ethoxymethyl)amino]propyl}trimethoxysilane,
{3-[di(methoxyethyl)amino]propyl}trimethoxysilane,
{3-[di(ethoxyethyl)amino]propyl}trimethoxysilane,
{3-[di(methoxymethyl)amino]propyl}triethoxysilane,
{3-[di(ethoxymethyl)amino]propyl}triethoxysilane,
{3-[di(methoxyethyl)amino]propyl}triethoxysilane, and
{3-[di(ethoxyethyl)amino]propyl}triethoxysilane;
{3-[di(alkoxyalkyl)amino]propyl}alkyldialkoxysilanes such as
{3-[di(methoxymethyl)amino] propyl}methyldimethoxysilane,
{3-[di(ethoxymethyl)amino] propyl}methyldimethoxysilane,
{3-[di(methoxyethyl)amino] propyl}methyldimethoxysilane,
{3-[di(ethoxyethyl)amino]propyl}methyldimethoxysilane,
{3-[di(methoxymethyl)amino] propyl}ethyldimethoxysilane,
{3-[di(ethoxymethyl)amino]propyl}ethyldimethoxysilane,
{3-[di (methoxyethyl) amino]propyl}ethyldimethoxysilane, {3-[di(ethoxyethyl)amino]propyl}ethyldimethoxysilane,
{3-[di(methoxymethyl)amino]propyl}methyldiethoxysilane,
{3-[di(ethoxymethyl)amino]propyl}methyldiethoxysilane,
{3-[di(methoxyethyl)amino]propyl}methyldiethoxysilane,
{3-[di(ethoxyethyl)amino]propyl}methyldiethoxysilane,
{3-[di(methoxymethyl)amino]propyl}ethyldiethoxysilane,
{3-[di(ethoxymethyl)amino]propyl}ethyldiethoxysilane,
{3-[di(methoxyethyl)amino]propyl}ethyldiethoxysilane, and
{3-[di(ethoxyethyl)amino]propyl}ethyldiethoxysilane; and
{3-[di(alkoxyalkyl)amino]propyl}dialkylalkoxysilanes such as
{3-[di(methoxymethyl)amino]propyl}dimethylmethoxysilane,
{3-[di(ethoxymethyl)amino]propyl}dimethylmethoxysilane,
{3-[di(methoxyethyl)amino]propyl}dimethylmethoxysilane,
{3-[di(ethoxyethyl)amino]propyl}dimethylmethoxysilane,
{3-[di(methoxymethyl)amino]propyl}diethylmethoxysilane,
{3-[di(ethoxymethyl)amino]propyl}diethylmethoxysilane,
{3-[di(methoxyethyl)amino]propyl}diethylmethoxysilane,
{3-[di(ethoxyethyl)amino]propyl}diethylmethoxysilane,
{3-[di(methoxymethyl)amino]propyl}dimethylethoxysilane,
{3-[di(ethoxymethyl)amino]propyl}dimethylethoxysilane,
{3-[di(methoxyethyl)amino]propyl}dimethylethoxysilane,
{3-[di(ethoxyethyl)amino]propyl}dimethylethoxysilane,
{3-[di(methoxymethyl)amino]propyl}diethylethoxysilane,
{3-[di(ethoxymethyl)amino]propyl}diethylethoxysilane,
{3-[di(methoxyethyl)amino]propyl}diethylethoxysilane, and
{3-[di(ethoxyethyl)amino]propyl}diethylethoxysilane.

The compound in which formula (IIa) is a di(alkylene oxide)amino group can be exemplified by the following: compounds in which formula (IIa) is a di(epoxy)amino group, such as
{3-[di(epoxy)amino]propyl}trimethoxysilane,
{3-[di(epoxy)amino]propyl}triethoxysilane,
{3-[di(epoxy)amino]propyl}methyldimethoxysilane,
{3-[di(epoxy)amino]propyl}ethyldimethoxysilane,
{3-[di(epoxy)amino]propyl}methyldiethoxysilane,
{3-[di(epoxy)amino]propyl}ethyldiethoxysilane,
{3-[di(epoxy)amino]propyl}dimethylmethoxysilane,
{3-[di(epoxy)amino]propyl}diethylmethoxysilane,
{3-[di(epoxy)amino]propyl}dimethylethoxysilane, and
{3-[di(epoxy)amino]propyl}diethylethoxysilane; and
compounds in which formula (IIa) is a di(tetrahydrofuranyl)amino group, such as
{3-[di(tetrahydrofuranyl)amino]propyl}trimethoxysilane,
{3-[di(tetrahydrofuranyl)amino]propyl}triethoxysilane,
{3-[di(tetrahydrofuranyl)amino]propyl}methyldimethoxysilane,
{3-[di(tetrahydrofuranyl)amino]propyl}ethyldimethoxysilane,
{3-[di(tetrahydrofuranyl)amino]propyl}methyldiethoxysilane,
{3-[di(tetrahydrofuranyl)amino]propyl}ethyldiethoxysilane,
{3-[di(tetrahydrofuranyl)amino]propyl}dimethylmethoxysilane,
{3-[di(tetrahydrofuranyl)amino]propyl}diethylmethoxysilane,
{3-[di(tetrahydrofuranyl)amino]propyl}dimethylethoxysilane, and
{3-[di(tetrahydrofuranyl)amino]propyl}diethylethoxysilane.

The compound in which formula (IIa) is a di(alkylene oxide alkyl)amino group can be exemplified by compounds in which formula (IIa) is a di(glycidyl)amino group, such as
{3-[di(glycidyl)amino]propyl}trimethoxysilane,
{3-[di(glycidyl)amino]propyl}triethoxysilane,
{3-[di(glycidyl)amino]propyl}methyldimethoxysilane,
{3-[di(glycidyl)amino]propyl}ethyldimethoxysilane,
{3-[di(glycidyl)amino]propyl}methyldiethoxysilane,
{3-[di(glycidyl)amino]propyl}ethyldiethoxysilane,
{3-[di(glycidyl)amino]propyl}dimethylmethoxysilane,
{3-[di(glycidyl)amino]propyl}diethylmethoxysilane,
{3-[di(glycidyl)amino]propyl}dimethylethoxysilane, and
{3-[di(glycidyl)amino]propyl}diethylethoxysilane; and
compounds in which formula (IIa) is a di(tetrahydrofurfuryl)amino group, such as
{3-[di(tetrahydrofurfuryl)amino]propyl}trimethoxysilane,
{3-[di(tetrahydrofurfuryl)amino]propyl}triethoxysilane,
{3-[di(tetrahydrofurfuryl)amino]propyl}methyldimethoxysilane,
{3-[di(tetrahydrofurfuryl)amino]propyl}ethyldimethoxysilane,
{3-[di(tetrahydrofurfuryl)amino]propyl}methyldiethoxysilane,
{3-[di(tetrahydrofurfuryl)amino]propyl}ethyldiethoxysilane,
{3-[di(tetrahydrofurfuryl)amino]propyl}dimethylmethoxysilane,
{3-[di(tetrahydrofurfuryl)amino]propyl}diethylmethoxysilane,
{3-[di(tetrahydrofurfuryl)amino]propyl}dimethylethoxysilane, and
{3-[di(tetrahydrofurfuryl)amino]propyl}diethylethoxysilane.

The compound in which formula (IIa) is a trialkylsilyl group can be exemplified by the following:
{3-[di(trialkylsilyl)amino]propyl}trialkoxysilanes such as
{3-[di(trimethylsilyl)amino]propyl}trimethoxysilane,
{3-[di(t-butyldimethylsilyl)amino]propyl}trimethoxysilane,
{3-[di(trimethylsilyl)amino]propyl}triethoxysilane, and
{3-[di(t-butyldimethylsilyl)amino]propyl}triethoxysilane;
{3-[di(trialkylsilyl)amino]propyl}alkyldialkoxysilanes such as
{3-[di(trimethylsilyl)amino]propyl}methyldimethoxysilane,
{3-[di(t-butyldimethylsilyl)amino]propyl}methyldimethoxysilane,
{3-[di(trimethylsilyl)amino]propyl}methyldiethoxysilane, and
{3-[di(t-butyldimethylsilyl)amino]propyl}methyldiethoxysilane; and
{3-[di(trialkylsilyl)amino]propyl}dialkylalkoxysilanes such as
{3-[di(trimethylsilyl)amino]propyl}dimethylmethoxysilane,
{3-[di(t-butyldimethylsilyl)amino]propyl}dimethylmethoxysilane,
{3-[di(trimethylsilyl)amino]propyl}dimethylethoxysilane, and
{3-[di(t-butyldimethylsilyl)amino]propyl}dimethylethoxysilane.

[3-(dialkylamino)propyl]trialkoxysilanes are preferred among the preceding, and
[3-(dimethylamino)propyl]trimethoxysilane,

[3-(diethylamino)propyl]trimethoxysilane,
[3-(dimethylamino)propyl]triethoxysilane, and
[3-(diethylamino)propyl]triethoxysilane are more preferred.

The compound represented by formula (II) can also be exemplified by compounds in which formula (IIa) is a cyclic amino group such as a 1-piperidino group, 1-hexamethyleneimino group, 1-imidazolyl group, 4,5-dihydro-1-imidazolyl group, 1-piperazinyl group, or morpholino group.

The compound in which formula (IIa) is a 1-piperidino group can be exemplified by
3-(1-piperidino)propyltrimethoxysilane,
3-(1-piperidino)propyltriethoxysilane,
3-(1-piperidino)propylmethyldimethoxysilane,
3-(1-piperidino)propylethyldimethoxysilane,
3-(1-piperidino)propylmethyldiethoxysilane, and
3-(1-piperidino)propylethyldiethoxysilane.

The compound in which formula (IIa) is a 1-hexamethyleneimino group can be exemplified by
3-(1-hexamethyleneimino)propyltrimethoxysilane,
3-(1-hexamethyleneimino)propyltriethoxysilane,
3-(1-hexamethyleneimino)propylmethyldimethoxysilane,
3-(1-hexamethyleneimino)propylethyldimethoxysilane,
3-(1-hexamethyleneimino)propylmethyldiethoxysilane, and
3-(1-hexamethyleneimino)propylethyldiethoxysilane.

The compound in which formula (IIa) is a 1-imidazolyl group can be exemplified by
N-(3-trimethoxysilylpropyl)imidazole and
N-(3-triethoxysilylpropyl)imidazole.

The compound in which formula (IIa) is a 4,5-dihydro-1-imidazolyl group can be exemplified by
N-(3-trimethoxysilylpropyl)-4,5-dihydroimidazole and
N-(3-triethoxysilylpropyl)-4,5-dihydroimidazole.

The compound in which formula (IIa) is a 1-piperazinyl group can be exemplified by
3-(1-piperazinyl)propyltrimethoxysilane,
3-(1-piperazinyl)propyltriethoxysilane,
3-(1-piperazinyl)propylmethyldimethoxysilane,
3-(1-piperazinyl)propylethyldimethoxysilane,
3-(1-piperazinyl)propylmethyldiethoxysilane, and
3-(1-piperazinyl)propyaethyldiethoxysilane.

The compound in which formula (IIa) is a morpholino group can be exemplified by
3-morpholinopropyltrimethoxysilane,
3-morpholinopropyltriethoxysilane,
3-morpholinopropylmethyldimethoxysilane,
3-morpholinopropylethyldimethoxysilane,
3-morpholinopropylmethyldiethoxysilane, and
3-morpholinopropylethyldiethoxysilane.

Among the preceding, compounds in which formula (IIa) is a 1-imidazolyl group and compounds in which formula (IIa) is a 4,5-dihydro-1-imidazolyl group are preferred, and
N-(3-trimethoxysilylpropyl)imidazole,
N-(3-triethoxysilylpropyl)imidazole,
N-(3-trimethoxysilylpropyl)-4,5-dihydroimidazole, and
N-(3-triethoxysilylpropyl)-4,5-dihydroimidazole are more preferred.

Compounds having a group represented by formula (III) below (modifying agent 2) are also suitable examples of the aforementioned modifying agent:

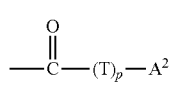

(III)

(in the formula, p represents an integer of 0 or 1, T represents a $C_{1-20}$ hydrocarbylene group or a $C_{1-20}$ substituted hydrocarbylene group, and $A^2$ represents a nitrogen atom-bearing functional group).

p represents an integer of 0 or 1. T represents a $C_{1-20}$ hydrocarbylene group or a $C_{1-20}$ substituted hydrocarbylene group. $A^2$ represents a nitrogen atom-bearing functional group and can be exemplified by amino, isocyano, cyano, pyridyl, piperidyl, pyrazinyl, morpholino, and so forth.

The compound having a group represented by formula (III) can be exemplified by compounds having a group with the following formula (IIIa), in which p in formula (III) is 0 and $A^2$ is an amino group.

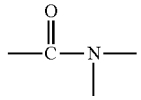

(IIIa)

The compound having a group represented by formula (IIIa) can be exemplified by carboxylic acid amide compounds, e.g., formamide, acetamide, propionamide, and so forth. Other examples are cyclic compounds such as imidazolidinone and derivatives thereof and lactams.

The compound having a group represented by formula (IIIa) can be exemplified by carboxylic acid amide compounds with the following formula (IV):

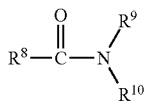

(IV)

(in the formula, $R^8$ represents a hydrogen atom, a $C_{1-10}$ hydrocarbyl group, a $C_{1-10}$ substituted hydrocarbyl group, or a heterocyclic group having a nitrogen atom and/or oxygen atom as a heteroatom; $R^9$ and $R^{10}$ each independently represent a $C_{1-10}$ group optionally having at least one type of atom selected from the group of atoms consisting of a nitrogen atom, oxygen atom, and silicon atom; $R^9$ and $R^{10}$ may be bonded to each other to form a cyclic structure together with the nitrogen atom; and $R^9$ and $R^{10}$ may be a single group bonded to the nitrogen by a double bond).

The hydrocarbyl group encompassed by $R^8$ can be exemplified by alkyl groups such as methyl, ethyl, n-propyl, isopropyl, n-butyl, sec-butyl, and t-butyl; aryl groups such as phenyl, methylphenyl, ethylphenyl, and naphthyl; and aralkyl groups such as benzyl.

The substituted hydrocarbyl group encompassed by $R^8$ can be exemplified by substituted hydrocarbyl groups having as a substituent at least one type of group selected from the group consisting of nitrogen atom-bearing groups and oxygen atom-bearing groups. The group that has a nitrogen atom-bearing group as a substituent can be exemplified by dialkylaminoalkyl groups such as dimethylaminoethyl and diethylaminoethyl, while the group that has an oxygen atom-bearing group as a substituent can be exemplified by alkoxyalkyl groups such as methoxymethyl, methoxyethyl, ethoxymethyl, and ethoxyethyl.

The heterocyclic group having a nitrogen atom and/or oxygen atom as a heteroatom, encompassed by $R^8$, represents a residue of a heterocyclic compound that contains a nitrogen atom and/or oxygen atom in a ring; this group can be exemplified by a 2-pyridyl group, 3-pyridyl group, 4-pyridyl group, and 2-furyl group.

$R^8$ is preferably a $C_{1-10}$ hydrocarbyl group or a $C_{1-10}$ substituted hydrocarbyl group, is more preferably a $C_{1-4}$ alkyl group, and is particularly preferably a methyl, ethyl, n-propyl, or n-butyl group.

The $R^9$ and $R^{10}$ in formula (IV) can be exemplified by $C_{1-10}$ hydrocarbyl groups and $C_{1-10}$ substituted hydrocarbyl groups. The hydrocarbyl groups encompassed by $R^9$ and $R^{10}$ can be exemplified by alkyl groups such as methyl, ethyl, n-propyl, isopropyl, n-butyl, sec-butyl, and t-butyl; aryl groups such as phenyl, methylphenyl, ethylphenyl, and naphthyl; and aralkyl groups such as benzyl.

The substituted hydrocarbyl groups encompassed by $R^9$ and $R^{10}$ can be exemplified by substituted hydrocarbyl groups having as a substituent at least one type of group selected from the group consisting of nitrogen atom-bearing groups and oxygen atom-bearing groups. The group that has a nitrogen atom-bearing group as a substituent can be exemplified by dialkylaminoalkyl groups such as dimethylaminoethyl and diethylaminoethyl, while the group that has an oxygen atom-bearing group as a substituent can be exemplified by alkoxyalkyl groups such as methoxymethyl, methoxyethyl, ethoxymethyl, and ethoxyethyl.

The group in which $R^9$ and $R^{10}$ are bonded to each other can be exemplified by $C_{2-20}$ divalent groups optionally having at least one type of atom selected from the group of atoms consisting of a nitrogen atom, oxygen atom, and silicon atom. Examples thereof include alkylene groups such as trimethylene, tetramethylene, pentamethylene, and hexamethylene; oxydialkylene groups such as oxydiethylene and oxydipropylene; and nitrogenous groups such as the group represented by —CH$_2$CH$_2$—NH—CH$_2$— and the group represented by —CH$_2$CH$_2$—N=CH—.

The single group bonded to the nitrogen by a double bond and encompassed by $R^9$ and $R^{10}$ can be exemplified by $C_{2-12}$ divalent groups optionally having at least one type of atom selected from the group of atoms consisting of a nitrogen atom and oxygen atom. Examples thereof include an ethylidene group, 1-methylpropylidene group, 1,3-dimethylbutylidene group, 1-methylethylidene group, and 4-N,N-dimethylaminobenzylidene group.

$R^9$ and $R^{10}$ are, independently, preferably a hydrocarbyl group, more preferably an alkyl group, even more preferably a $C_{1-4}$ alkyl group, and particularly preferably a methyl, ethyl, n-propyl, or n-butyl group.

The carboxylic acid amide compound represented by formula (IV) can be exemplified by formamide compounds such as formamide, N,N-dimethylformamide, and N,N-diethylformamide; acetamide compounds such as acetamide, N,N-dimethylacetamide, N,N-diethylacetamide, aminoacetamide, N,N-dimethyl-N',N'-dimethylaminoacetamide, N,N-dimethylaminoacetamide, N-ethylaminoacetamide, N,N-dimethyl-N'-ethylaminoacetamide, N,N-dimethylaminoacetamide, and N-phenyldiacetamide; propionamide compounds such as propionamide and N,N-dimethylpropionamide; pyridylamide compounds such as 4-pyridylamide and N,N-dimethyl-4-pyridylamide; benzamide compounds such as benzamide, N,N-dimethylbenzamide, N',N'-(p-dimethylamino)benzamide, N',N'-(p-diethylamino)benzamide, N,N-dimethyl-N',N'-(p-dimethylamino)benzamide, and N,N-dimethyl-N',N'-(p-diethylamino)benzamide; acrylamide compounds such as N,N-dimethylacrylamide and N,N-diethylacrylamide; methacrylamide compounds such as N,N-dimethylmethacrylamide and N,N-diethylmethacrylamide; nicotinamide compounds such as N,N-dimethylnicotinamide and N,N-diethylnicotinamide; phthalamide compounds such as N,N,N',N'-tetramethylphthalamide and N,N,N',N'-tetraethylphthalamide; and phthalimide compounds such as N-methylphthalimide and N-ethylphthalimide.

The cyclic compound having a group represented by formula (IIIa) can be exemplified by compounds with the following formula (Va) and compounds with the following formula (Vb):

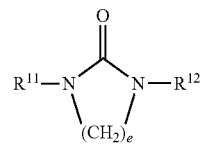

(Va)

(in the formula, e represents an integer from 0 to 10 and $R^{11}$ and $R^{12}$ each independently represent a $C_{1-20}$ hydrocarbyl group or $C_{1-20}$ substituted hydrocarbyl group)

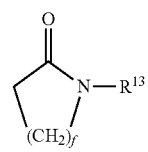

(Vb)

(in the formula, f represents an integer from 0 to 10 and $R^{13}$ represents a $C_{1-20}$ hydrocarbyl group or $C_{1-20}$ substituted hydrocarbyl group).

$R^{11}$, $R^{12}$, and $R^{13}$ in formulas (Va) and (Vb) each independently represent a $C_{1-20}$ hydrocarbyl group or $C_{1-20}$ substituted hydrocarbyl group. The hydrocarbyl groups encompassed by $R^{11}$, $R^{12}$, and $R^{13}$ can be exemplified by alkyl groups such as methyl, ethyl, n-propyl, isopropyl, n-butyl, sec-butyl, and t-butyl; aryl groups such as phenyl, methylphenyl, ethylphenyl, and naphthyl; and aralkyl groups such as benzyl.

The substituted hydrocarbyl groups encompassed by $R^{11}$, $R^{12}$, and $R^{13}$ can be exemplified by substituted hydrocarbyl groups that have as a substituent at least one type of group selected from the group consisting of nitrogen atom-bearing groups, oxygen atom-bearing groups, and silicon atom-bearing groups. The group having a nitrogen atom-bearing group as a substituent can be exemplified by dialkylaminoalkyl groups such as dimethylaminoethyl and diethylaminoethyl; the group having an oxygen atom-bearing group as a substituent can be exemplified by alkoxyalkyl groups such as methoxymethyl, methoxyethyl, ethoxymethyl, and ethoxyethyl, and by alkoxyaryl groups such as methoxyphenyl and ethoxyphenyl; and the group having a silicon atom-bearing group as a substituent can be exemplified by trimethylsilylmethyl, t-butyldimethylsilyloxymethyl, and trimethoxysilylpropyl.

The $R^{11}$ and $R^{12}$ in formula (Va) are, independently, preferably a hydrocarbyl group, more preferably an alkyl group, and even more preferably a methyl group.

$R^{13}$ in formula (Vb) is preferably a hydrocarbyl group, more preferably an alkyl group or aryl group, and even more preferably a methyl or phenyl group.

e and f in formulas (Va) and (Vb) each represent an integer from 0 to 10. e and f are, independently, preferably at least 2 when viewed from the perspective of increasing the fuel economy, wet-grip performance, and abrasion resistance in good balance, but are, independently, preferably not more than 7 from the perspective of improving the economics of production.

The compound represented by formula (Va) can be exemplified by 1,3-hydrocarbyl-substituted 2-imidazolidinones such as 1,3-dimethyl-2-imidazolidinone, 1,3-diethyl-2-imidazolidinone, 1,3-di(n-propyl)-2-imidazolidinone, 1,3-di(t-butyl)-2-imidazolidinone, and 1,3-diphenyl-2-imidazolidinone. The compound represented by formula (Va) is preferably a 1,3-substituted 2-imidazolidinone, more preferably a 1,3-hydrocarbyl-substituted 2-imidazolidinone, and even more preferably a 1,3-dialkyl-2-imidazolidinone. The 1,3-dialkyl-2-imidazolidinone is preferably 1,3-dimethyl-2-imidazolidinone, 1,3-diethyl-2-imidazolidinone, or 1,3-di(n-propyl)-2-imidazolidinone and more preferably 1,3-dimethyl-2-imidazolidinone.

The compound represented by formula (Vb) can be exemplified by

β-propiolactam compounds such as N-methyl-β-propiolactam, N-(t-butyl)-β-propiolactam, and N-phenyl-β-propiolactam;

2-pyrrolidone compounds such as 1-methyl-2-pyrrolidone, 1-(t-butyl)-2-pyrrolidone, 1-phenyl-2-pyrrolidone, 1-(p-methylphenyl)-2-pyrrolidone, 1-(p-methoxyphenyl)-2-pyrrolidone, 1-benzyl-2-pyrrolidone, 1-naphthyl-2-pyrrolidone, 1-phenyl-5-methyl-2-pyrrolidone, 1-(t-butyl)-5-methyl-2-pyrrolidone, and 1-(t-butyl)-1,3-dimethyl-2-pyrrolidone;

2-piperidone compounds such as 1-(t-butyl)-2-piperidone, 1-phenyl-2-piperidone, 1-(p-methylphenyl)-2-piperidone, 1-(p-methoxyphenyl)-2-piperidone, and 1-naphthyl-2-piperidone;

ε-caprolactam compounds such as N-methyl-ε-caprolactam, N-ethyl-ε-caprolactam, N-(n-propyl)-ε-caprolactam, N-phenyl-ε-caprolactam, N-(p-methoxyphenyl)-ε-caprolactam, and N-benzyl-ε-caprolactam; and ω-laurolactam compounds such as N-phenyl-ω-laurolactam.

The compound represented by formula (Vb) is preferably a 2-pyrrolidone compound or an ε-caprolactam compound; more preferably a 1-hydrocarbyl-substituted 2-pyrrolidone or N-hydrocarbyl-substituted ε-caprolactam; even more preferably a 1-alkyl-substituted 2-pyrrolidone, 1-aryl-substituted 2-pyrrolidone, N-alkyl-substituted ε-caprolactam, or N-aryl-substituted ε-caprolactam; and particularly preferably 1-phenyl-2-pyrrolidone or N-methyl-ε-caprolactam.

The compound having a group represented by formula (III) can also be exemplified by compounds having a group with the following formula (IIIb), in which p in formula (III) is 1 and $A^2$ is an amino group:

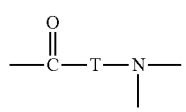

(IIIb)

(in the formula, T represents a $C_{1-20}$ hydrocarbylene group or $C_{1-20}$ substituted hydrocarbylene group).

The compound having a group represented by formula (IIIb) can be exemplified by benzaldehyde compounds, acetophenone compounds, and benzophenone compounds.

The compound having a group represented by formula (IIIb) can be exemplified by compounds with the following formula (VI):

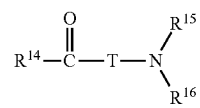

(VI)

(in the formula, $R^{14}$ represents a hydrogen atom, a $C_{1-10}$ hydrocarbyl group, a $C_{1-10}$ substituted hydrocarbyl group, or a heterocyclic group having a nitrogen atom and/or oxygen atom as a heteroatom; $R^{15}$ and $R^{16}$ each independently represent a $C_{1-10}$ group optionally having at least one type of atom selected from the group of atoms consisting of a nitrogen atom, oxygen atom, and silicon atom; $R^{15}$ and $R^{16}$ may be bonded to each other to form a cyclic structure together with the nitrogen atom; $R^{15}$ and $R^{16}$ may be a single group bonded to the nitrogen by a double bond; and T represents a $C_{1-20}$ hydrocarbylene group or $C_{1-20}$ substituted hydrocarbylene group).

The hydrocarbyl group encompassed by $R^{14}$ can be exemplified by alkyl groups such as methyl, ethyl, n-propyl, isopropyl, n-butyl, sec-butyl, and t-butyl; aryl groups such as phenyl, methylphenyl, ethylphenyl, and naphthyl; and aralkyl groups such as benzyl.

The substituted hydrocarbyl group encompassed by $R^{14}$ can be exemplified by substituted hydrocarbyl groups having as a substituent at least one type of group selected from the group consisting of nitrogen atom-bearing groups and oxygen atom-bearing groups. The group having a nitrogen atom-bearing group as a substituent can be exemplified by dialkylaminoalkyl groups such as dimethylaminoethyl and diethylaminoethyl, while the group having an oxygen atom-bearing group as a substituent can be exemplified by alkoxyalkyl groups such as methoxymethyl, methoxyethyl, ethoxymethyl, and ethoxyethyl.

The heterocyclic group having a nitrogen atom and/or oxygen atom as a heteroatom, encompassed by $R^{14}$, represents a residue of a heterocyclic compound that contains a nitrogen atom and/or oxygen atom in a ring; this group can be exemplified by a 2-pyridyl group, 3-pyridyl group, 4-pyridyl group, and 2-furyl group.

$R^{14}$ is preferably a hydrogen atom, a $C_{1-10}$ hydrocarbyl group, or a $C_{1-10}$ substituted hydrocarbyl group. The $C_{1-10}$ hydrocarbyl group is preferably a $C_{1-4}$ alkyl group or a phenyl group and particularly preferably a methyl, ethyl, n-propyl, n-butyl, or phenyl group. The $C_{1-10}$ substituted hydrocarbyl group is preferably an aryl group that has a nitrogen atom-bearing group as a substituent and more preferably a dialkylaminophenyl group or a 4-morpholinophenyl group.

$R^{15}$ and $R^{16}$ in formula (VI) can be exemplified by $C_{1-10}$ hydrocarbyl groups and $C_{1-10}$ substituted hydrocarbyl groups.

The hydrocarbyl groups encompassed by $R^{15}$ and $R^{16}$ can be exemplified by alkyl groups such as methyl, ethyl, n-propyl, isopropyl, n-butyl, sec-butyl, and t-butyl; aryl groups such as phenyl, methylphenyl, ethylphenyl, and naphthyl; and aralkyl groups such as benzyl.

The substituted hydrocarbyl groups encompassed by $R^{15}$ and $R^{16}$ can be exemplified by substituted hydrocarbyl groups having as a substituent at least one type of group selected from the group consisting of nitrogen atom-bearing groups and oxygen atom-bearing groups. The group having a nitrogen atom-bearing group as a substituent can be exemplified by dialkylaminoalkyl groups such as dimethylaminoethyl and diethylaminoethyl, while the group having an oxygen atom-bearing group as a substituent can be exemplified by alkoxyalkyl groups such as methoxymethyl, methoxyethyl, ethoxymethyl, and ethoxyethyl.

The group in which $R^{15}$ and $R^{16}$ are bonded to each other can be exemplified by $C_{2-20}$ divalent groups optionally having at least one type of atom selected from the group of atoms consisting of a nitrogen atom, oxygen atom, and silicon atom. Examples thereof include alkylene groups such as trimethylene, tetramethylene, pentamethylene, and hexamethylene; oxydialkylene groups such as oxydiethylene and oxydipropylene; and nitrogenous groups such as the group represented by —$CH_2CH_2$—NH—$CH_2$— and the group represented by —$CH_2CH_2$—N=CH—.

The single group bonded to the nitrogen by a double bond and encompassed by $R^{15}$ and $R^{16}$ can be exemplified by $C_{2-12}$ divalent groups optionally having at least one type of atom selected from the group of atoms consisting of a nitrogen atom and oxygen atom. Examples thereof include an ethylidene group, 1-methylpropylidene group, 1,3-dimethylbutylidene group, 1-methylethylidene group, and 4-N,N-dimethylaminobenzylidene group.

$R^{15}$ and $R^{16}$ are, independently, preferably a hydrocarbyl group, more preferably an alkyl group, even more preferably a $C_{1-4}$ alkyl group, and particularly preferably a methyl, ethyl, n-propyl, or n-butyl group.

The hydrocarbylene group encompassed by T can be exemplified by alkylene groups such as methylene, ethylene, trimethylene, tetramethylene, pentamethylene, and hexamethylene; and arylene groups such as phenylene, methylphenylene, ethylphenylene, and naphthylene.

The substituted hydrocarbylene group encompassed by T can be exemplified by substituted hydrocarbylene groups that have as a substituent at least one type of group selected from the group consisting of nitrogen atom-bearing groups and oxygen atom-bearing groups. The group that has a nitrogen atom-bearing group as a substituent can be exemplified by dialkylaminoalkylene groups such as dimethylaminoethylene and diethylaminoethylene; and dialkylaminoarylene groups such as dimethylaminophenylene and diethylaminophenylene, while the group that has an oxygen atom-bearing group as a substituent can be exemplified by alkoxyalkylene groups such as methoxymethylene, methoxyethylene, ethoxymethylene, and ethoxyethylene.

T is preferably a hydrocarbylene group, more preferably an arylene group, and even more preferably a phenylene group.

The compound represented by formula (VI) can be exemplified by dialkylamino-substituted benzaldehyde compounds such as 4-dimethylaminobenzaldehyde, 4-diethylaminobenzaldehyde, and 3,5-bis(dihexylamino)benzaldehyde; dialkylamino-substituted acetophenone compounds such as 4-dimethylaminoacetophenone and 4-diethylaminoacetophenone; heterocyclic group-substituted acetophenone compounds such as 4-morpholinoacetophenone, 4'-imidazol-1-yl-acetophenone, and 4-pyrazolylacetophenone; dialkylamino-substituted benzophenone compounds such as 4,4'-bis(dimethylamino)benzophenone, bis(diethylamino)benzophenone, 4-dimethylaminobenzophenone, 4-diethylaminobenzophenone, 3-dimethylaminobenzophenone, and 3-diethylaminobenzophenone; and heterocyclic group-substituted benzophenone compounds such as 4-morpholinobenzophenone, 4'-(imidazol-1-yl)benzophenone, and 4-pyrazolylbenzophenone.

The compound represented by formula (VI) is preferably a substituted acetophenone compound or substituted benzophenone compound and can be exemplified by compounds with the following formula (Vc) and compounds with the following formula (Vd):

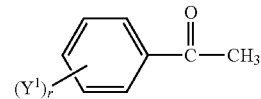

(Vc)

(in the formula, r represents an integer of 1 or 2, $Y^1$ represents a nitrogen atom-bearing functional group that is a substituent on the benzene ring, and when a plurality of $Y^1$'s are present, the plurality of $Y^1$'s may be the same as each other or may differ from one another)

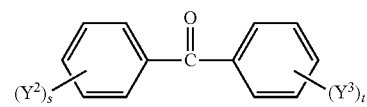

(Vd)

(in the formula, s represents an integer of 1 or 2; t represents an integer from 0 to 2; $Y^2$ and $Y^3$ each represent a nitrogen atom-bearing functional group that is a substituent on the benzene ring; when a plurality of $Y^2$'s are present, the plurality of $Y^2$'s may be the same as each other or may differ from one another; and when a plurality of $Y^3$'s are present, the plurality of $Y^3$'s may be the same as each other or may differ from one another).

$Y^1$, $Y^2$, and $Y^3$ in formulas (Vc) and (Vd) represent nitrogen atom-bearing functional groups and can be exemplified by amino, isocyano, cyano, pyridyl, piperidyl, pyrazinyl, pyrimidinyl, pyrrolyl, imidazolyl, pyrazolyl, and morpholino groups. A dialkylamino, imidazolyl, and morpholino groups are preferred. A $C_{1-10}$ alkyl group is preferred for the alkyl in the dialkylamino group.

The compound represented by formula (VI) is more preferably a heterocyclic group-substituted acetophenone compound, a dialkylamino-substituted benzophenone compound, or a heterocyclic group-substituted benzophenone compound and is particularly preferably 4'-imidazol-1-yl-acetophenone, 4-morpholinoacetophenone, 4-dimethylaminobenzophenone, 4-diethylaminobenzophenone, 4,4'-bis(dimethylamino)benzophenone, bis(diethylamino)benzophenone, or 4-morpholinobenzophenone.

Compounds with the following formula (VII) (modifying agent 3) are also suitable examples of the modifying agent:

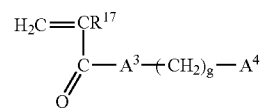

(VII)

(in the formula, g represents an integer from 1 to 10; $R^{17}$ represents a hydrogen atom, a $C_{1-6}$ hydrocarbyl group, or a $C_{1-6}$ substituted hydrocarbyl group; $A^3$ represents an oxygen atom or the group: —$NR^{18}$— ($R^{18}$ represents a hydrogen atom or a $C_{1-10}$ hydrocarbyl group); and $A^4$ represents a functional group bearing a nitrogen atom and/or oxygen atom).

g represents an integer from 1 to 10. Viewed from the perspective of improving the fuel economy, wet-grip performance, and abrasion resistance in good balance, g is preferably at least 2; however, viewed from the perspective of improving the economics of production, g is more preferably not more than 4. 3 is even more preferred.

$R^{17}$ in formula (VII) represents a hydrogen atom, a $C_{1-6}$ hydrocarbyl group, or a $C_{1-6}$ substituted hydrocarbyl group.

The hydrocarbyl group encompassed by $R^{17}$ can be exemplified by alkyl groups such as methyl, ethyl, n-propyl, isopropyl, n-butyl, sec-butyl, and t-butyl.

The substituted hydrocarbyl group encompassed by $R^{17}$ can be exemplified by substituted hydrocarbyl groups having as a substituent at least one type of group selected from the group consisting of nitrogen atom-bearing groups, oxygen atom-bearing groups, and silicon atom-bearing groups. The group having a nitrogen atom-bearing group as a substituent can be exemplified by dialkylaminoalkyl groups such as dimethylaminoethyl and diethylaminoethyl; the group having an oxygen atom-bearing group as a substituent can be exemplified by alkoxyalkyl groups such as methoxymethyl, methoxyethyl, ethoxymethyl, and ethoxyethyl; and the group having a silicon atom-bearing group as a substituent can be exemplified by trialkylsilylalkyl groups such as trimethylsilylmethyl, trialkylsilyloxyalkyl groups such as t-butyldimethylsilyloxymethyl, and trialkoxysilylalkyl groups such as trimethoxysilylpropyl.

The hydrocarbyl group for $R^{17}$ is preferably an alkyl group, more preferably a $C_{1-4}$ alkyl group, even more preferably a methyl or ethyl group, and yet more preferably a methyl group. The substituted hydrocarbyl group for $R^{17}$ is preferably an alkoxyalkyl group, more preferably a $C_{1-4}$ alkoxyalkyl group, even more preferably a methoxymethyl or ethoxyethyl group, and yet more preferably a methoxymethyl group.

Viewed in economic terms and from the perspective of increasing the fuel economy, wet-grip performance, and abrasion resistance in good balance, $R^{17}$ is preferably a hydrogen atom, an alkyl group, or an alkoxyalkyl group; more preferably a hydrogen atom, a $C_{1-4}$ alkyl, or $C_{1-4}$ alkoxyalkyl group; even more preferably a hydrogen atom, a methyl, or methoxymethyl group; and yet more preferably a hydrogen atom or a methyl group.

$A^3$ in formula (VII) represents an oxygen atom or the group: —$NR^{18}$— wherein $R^{18}$ represents a hydrogen atom or a $C_{1-10}$ hydrocarbyl group.

The hydrocarbyl group encompassed by $R^{18}$ can be exemplified by alkyl groups such as methyl, ethyl, n-propyl, isopropyl, n-butyl, sec-butyl, and t-butyl; aryl groups such as phenyl, methylphenyl, ethylphenyl, and naphthyl; and aralkyl groups such as benzyl.

The hydrocarbyl group for $R^{18}$ is preferably an alkyl group, more preferably a $C_{1-4}$ alkyl group, and even more preferably a methyl or ethyl group.

$R^{18}$ is preferably a hydrogen atom or an alkyl group, more preferably a hydrogen atom or a $C_{1-4}$ alkyl group; even more preferably a hydrogen atom, a methyl or ethyl group; and yet more preferably a hydrogen atom or a methyl group.

$A^4$ in formula (VII) represents a functional group bearing a nitrogen atom and/or oxygen atom. The nitrogen atom-bearing functional group can be exemplified by amino, isocyano, cyano, pyridyl, piperidyl, piperazinyl, and morpholino.

The oxygen atom-bearing functional group can be exemplified by alkoxy groups such as methoxy, ethoxy, n-propoxy, isopropoxy, n-butoxy, sec-butoxy, and t-butoxy; alkoxyalkyl groups such as methoxymethyl, methoxyethyl, ethoxymethyl, and ethoxyethyl; alkoxyaryl groups such as methoxyphenyl and ethoxyphenyl; and alkylene oxide groups such as epoxy and tetrahydrofuranyl. Other examples are trialkylsilyloxy groups such as trimethylsilyloxy, triethylsilyloxy, and t-butyldimethylsilyloxy. A hydroxyl group is also an example.

A hydroxyl group or a group having the following formula (VIII) is preferred for $A^4$, and a group having the following formula (VIII) is more preferred:

(in the formula, $R^{19}$ and $R^{20}$ each independently represent a $C_{1-6}$ group optionally having at least one type of atom selected from the group of atoms consisting of a nitrogen atom, oxygen atom, and silicon atom; $R^{19}$ and $R^{20}$ may be bonded to each other to form a cyclic structure together with the nitrogen atom; and $R^{19}$ and $R^{20}$ may be a single group bonded to the nitrogen by a double bond).

$R^{19}$ and $R^{20}$ in formula (VIII) can be exemplified by $C_{1-6}$ hydrocarbyl groups, $C_{1-6}$ substituted hydrocarbyl groups, and substituted silyl groups.

The hydrocarbyl groups encompassed by $R^{19}$ and $R^{20}$ can be exemplified by alkyl groups such as methyl, ethyl, n-propyl, isopropyl, n-butyl, sec-butyl, tert-butyl, n-pentyl, neopentyl, isopentyl, and n-hexyl; cycloalkyl groups such as cyclohexyl; and a phenyl group.

The substituted hydrocarbyl groups encompassed by $R^{19}$ and $R^{20}$ can be exemplified by substituted hydrocarbyl groups that have as a substituent at least one type of group selected from the group consisting of nitrogen atom-bearing groups, oxygen atom-bearing groups, and silicon atom-bearing groups. The group having a nitrogen atom-bearing group as a substituent can be exemplified by dialkylaminoalkyl groups such as dimethylaminoethyl and diethylaminoethyl. The group having an oxygen atom-bearing group as a substituent can be exemplified by alkoxyalkyl groups such as methoxymethyl, methoxyethyl, ethoxymethyl, and ethoxyethyl; alkylene oxide groups such as epoxy and tetrahydrofuranyl; and alkylene oxide alkyl groups such as glycidyl and tetrahydrofurfuryl. The group having a silicon atom-bearing group as a substituent can be exemplified by trialkylsilylalkyl groups such as trimethylsilylmethyl.

As used herein, the term "alkylene oxide group" denotes a monovalent group provided by removing a hydrogen atom from the ring of a cyclic ether compound. The term "alkylene oxide alkyl group" denotes a group provided by substituting at least one hydrogen atom in an alkyl group with an alkylene oxide group.

The substituted silyl groups encompassed by $R^{19}$ and $R^{20}$ can be exemplified by trialkylsilyl groups such as trimethylsilyl, triethylsilyl, and t-butyldimethysilyl; and trialkoxysilyl groups such as trimethoxysilyl.

The group in which $R^{19}$ and $R^{20}$ are bonded to each other can be exemplified by $C_{2-12}$ divalent groups optionally having at least one type of atom selected from the group of atoms consisting of a nitrogen atom, oxygen atom, and silicon atom. Examples thereof include alkylene groups such as trimethylene, tetramethylene, pentamethylene, and hexamethylene; oxydialkylene groups such as oxydiethylene and oxydipropylene; and nitrogenous groups such as the group represented by —$CH_2CH_2$—NH—$CH_2$— and the group represented by —$CH_2CH_2$—N=CH—.

The group in which $R^{19}$ and $R^{20}$ are bonded to each other is preferably a nitrogenous group and more preferably the group represented by —$CH_2CH_2$—NH—$CH_2$— or the group represented by —$CH_2CH_2$—N=CH—.

The single group bonded to the nitrogen by a double bond and encompassed by $R^{19}$ and $R^{20}$ can be exemplified by $C_{2-12}$ divalent groups optionally having at least one type of atom selected from the group of atoms consisting of a nitrogen atom, oxygen atom, and silicon atom. Examples thereof include an ethylidene group, 1-methylpropylidene group, 1,3-dimethylbutylidene group, 1-methylethylidene group, and 4-N,N-dimethylaminobenzylidene group.

The hydrocarbyl group for $R^{19}$ and $R^{20}$ is preferably an alkyl group; more preferably a $C_{1-4}$ alkyl group; even more preferably a methyl, ethyl, n-propyl, or n-butyl group; and yet more preferably a methyl or ethyl group. The substituted hydrocarbyl group for $R^{19}$ and $R^{20}$ is preferably an alkoxyalkyl group, alkylene oxide group, or alkylene oxide alkyl group. The substituted silyl group for $R^{19}$ and $R^{20}$ is preferably a trialkylsilyl group or trialkoxysilyl group, more preferably a trialkylsilyl group, and even more preferably a trimethylsilyl or triethylsilyl group.

$R^{19}$ and $R^{20}$ are preferably a nitrogenous group in which $R^{19}$ and $R^{20}$ are bonded to each other, or are, independently, preferably an alkyl group, alkoxyalkyl group, alkylene oxide group, alkylene oxide alkyl group, or substituted silyl group and more preferably an alkyl group, alkylene oxide group, alkylene oxide alkyl group, or trialkylsilyl group.

The group represented by formula (VIII) can be exemplified by acyclic amino groups and cyclic amino groups.

The acyclic amino group can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino; di(alkoxyalkyl)amino groups such as di(methoxymethyl)amino, di(methoxyethyl)amino, di(ethoxymethyl)amino, and di(ethoxyethyl)amino; and di(trialkylsilyl)amino groups such as di(trimethylsilyl)amino and di(t-butyldimethylsilyl)amino. Other examples are di(alkylene oxide)amino groups such as di(epoxy)amino and di(tetrahydrofuranyl)amino; and di(alkylene oxide alkylamino groups such as di(glycidyl)amino and di(tetrahydrofurfuryl)amino. Additional examples are an ethylideneamino group, 1-methylpropylideneamino group, 1,3-dimethylbutylideneamino group, 1-methylethylideneamino group, and 4-N,N-dimethylaminobenzylideneamino group.

As used herein, the term "di(alkylene oxide)amino group" denotes an amino group in which two hydrogen atoms bonded to the nitrogen atom are substituted by two alkylene oxide groups, while the term "di(alkylene oxide alkylamino group" denotes an amino group in which two hydrogen atoms bonded to the nitrogen atom are substituted by two alkylene oxide alkyl groups.

The cyclic amino group can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino. The cyclic amino group can also be exemplified by 1-imidazolyl, 4,5-dihydro-1-imidazolyl, 1-imidazolidinyl, 1-piperazinyl, and morpholino.

Viewed from the perspective of the fuel economy, wet-grip performance, abrasion resistance, and long-term stability and easy availability of the compound, the group represented by formula (VIII) is preferably an acyclic amino group and is more preferably a dialkylamino group, di(alkylene oxide) amino group, di(alkylene oxide alkylamino group, or di(trialkylsilyl)amino group.

Acrylamide compounds and methacrylamide compounds are examples of the compound represented by formula (VII) in which $A^3$ is a secondary amino group.

The acrylamide compound in which $A^4$ is a nitrogen atom-bearing group can be exemplified by
N-(2-dimethylaminoethyl)acrylamide,
N-(2-diethylaminoethyl)acrylamide,
N-(3-dimethylaminopropyl)acrylamide,
N-(3-diethylaminopropyl)acrylamide,
N-(4-dimethylaminobutyl)acrylamide,
N-(4-diethylaminobutyl)acrylamide,
N-(3-morpholinopropyl)acrylamide, and
N-(3-cyanopropyl)acrylamide.

The methacrylamide compound in which $A^4$ is a nitrogen atom-bearing group can be exemplified by
N-(2-dimethylaminoethyl)methacrylamide,
N-(2-diethylaminoethyl)methacrylamide,
N-(3-dimethylaminopropyl)methacrylamide,
N-(3-diethylaminopropyl)methacrylamide,
N-(4-dimethylaminobutyl)methacrylamide,
N-(4-diethylaminobutyl)methacrylamide,
N-(3-morpholinopropyl)methacrylamide, and
N-(3-cyanopropyl)methacrylamide.

The acrylamide compound in which $A^4$ is an oxygen atom-bearing group can be exemplified by
N-(3-methoxypropyl)acrylamide,
N-(3-ethoxypropyl)acrylamide,
N-(propoxymethyl)acrylamide,
N-(butoxymethyl)acrylamide,
N-glycidylacrylamide, and
N-tetrahydrofurfurylacrylamide.

The methacrylamide compound in which $A^4$ is an oxygen atom-bearing group can be exemplified by
N-(3-methoxypropyl)methacrylamide,
N-(3-ethoxypropyl)methacrylamide,
N-(propoxymethyl)methacrylamide,
N-(butoxymethyl)methacrylamide,
N-glycidylmethacrylamide, and
N-tetrahydrofurfurylmethacrylamide.

The acrylamide compound in which $A^4$ is a group bearing both nitrogen and oxygen atoms can be exemplified by
N-(3-di(glycidyl)aminopropyl)acrylamide and
N-(3-di(tetrahydrofurfuryl)aminopropyl)acrylamide.

The methacrylamide compound in which $A^4$ is a group bearing both nitrogen and oxygen atoms can be exemplified by
N-(3-di(glycidyl)aminopropyl)methacrylamide and
N-(3-di(tetrahydrofurfuryl)aminopropyl)methacrylamide.

Acrylate compounds and methacrylate compounds are examples of the compound represented by formula (VII) in which $A^3$ is an oxygen atom.

The acrylate compound in which $A^4$ is a nitrogen atom-bearing group can be exemplified by
2-dimethylaminoethyl acrylate,
2-diethylaminoethyl acrylate,
3-dimethylaminopropyl acrylate,
3-diethylaminopropyl acrylate,
4-dimethylaminobutyl acrylate, and
4-diethylaminobutyl acrylate.

The methacrylate compound in which $A^4$ is a nitrogen atom-bearing group can be exemplified by
2-dimethylaminoethyl methacrylate,
2-diethylaminoethyl methacrylate,
3-dimethylaminopropyl methacrylate,
3-diethylaminopropyl methacrylate,
4-dimethylaminobutyl methacrylate, and
4-diethylaminobutyl methacrylate.

The acrylate compound in which $A^4$ is an oxygen atom-bearing group can be exemplified by
2-ethoxyethyl acrylate,
2-propoxyethyl acrylate,
2-butoxyethyl acrylate,
3-methoxypropyl acrylate,
3-ethoxypropyl acrylate, glycidyl acrylate, and
tetrahydrofurfuryl acrylate.

The methacrylate compound in which $A^4$ is an oxygen atom-bearing group can be exemplified by
2-ethoxyethyl methacrylate,
2-propoxyethyl methacrylate,
2-butoxyethyl methacrylate,
3-methoxypropyl methacrylate,
3-ethoxypropyl methacrylate,
glycidyl methacrylate, and
tetrahydrofurfuryl methacrylate.

The acrylate compound in which $A^4$ is a group bearing both nitrogen and oxygen atoms can be exemplified by
3-di(glycidyl)aminopropyl acrylate and
3-di(tetrahydrofurfuryl)aminopropyl acrylate.

The methacrylate compound in which $A^4$ is a group bearing both nitrogen and oxygen atoms can be exemplified by
3-di(glycidyl)aminopropyl methacrylate and
3-di(tetrahydrofurfuryl)aminopropyl methacrylate.

Viewed from the perspective of increasing the fuel economy, wet-grip performance, and abrasion resistance in good balance, the compound represented by formula (VII) is preferably a compound in which $A^4$ is a group represented by formula (VIII), more preferably a compound in which $A^3$ is an amino group and $A^4$ is a group represented by formula (VIII), and even more preferably a compound in which $A^3$ is a secondary amino group (—NH—) and $A^4$ is a group represented by formula (VIII).

The compound in which $A^3$ is a secondary amino group and $A^4$ is a group represented by formula (VIII) is preferably
an N-(3-dialkylaminopropyl)acrylamide or
N-(3-dialkylaminopropyl)methacrylamide and more preferably
N-(3-dimethylaminopropyl)acrylamide,
N-(3-diethylaminopropyl)acrylamide,
N-(3-dimethylaminopropyl)methacrylamide, or
N-(3-diethylaminopropyl)methacrylamide.

Silicon compounds (modifying agent 4) having a group with the following formula (IX) and/or a group with the following formula (X) are also suitable examples of the aforementioned modifying agent.

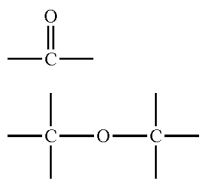

Examples of a group having the group represented by formula (IX) include an amide group, carboxylic acid ester group, methacryloyl group, and acryloyl group. Examples of a group having the group represented by formula (X) include oxydialkylene groups such as oxydimethylene and oxydiethylene; and alkylene oxide groups such as epoxy and tetrahydrofuranyl.

As used herein, the term "alkylene oxide group" denotes a monovalent group provided by removing a hydrogen atom from the ring of a cyclic ether compound.

The silicon compound preferably has a group with the following formula (XI):

(in the formula, $R^{21}$, $R^{22}$, and $R^{23}$ each independently represent a $C_{1-4}$ hydrocarbyl group or $C_{1-4}$ hydrocarbyloxy group, and at least one of $R^{21}$, $R^{22}$, and $R^{23}$ is a hydrocarbyloxy group).

The hydrocarbyl groups encompassed by $R^{21}$, $R^{22}$, and $R^{23}$ in formula (XI) can be exemplified by alkyl groups such as methyl, ethyl, n-propyl, isopropyl, n-butyl, sec-butyl, and tert-butyl. The hydrocarbyloxy groups encompassed by $R^{21}$, $R^{22}$, and $R^{23}$ can be exemplified by alkoxy groups such as methoxy, ethoxy, n-propoxy, isopropoxy, n-butoxy, sec-butoxy, and t-butoxy.

The hydrocarbyl group for $R^{21}$, $R^{22}$, and $R^{23}$ is preferably an alkyl group, more preferably a $C_{1-3}$ alkyl group, and even more preferably a methyl or ethyl group. The hydrocarbyloxy group for $R^{21}$, $R^{22}$, and $R^{23}$ is preferably an alkoxy group, more preferably a $C_{1-3}$ alkoxy group, and even more preferably a methoxy or ethoxy group.

Viewed from the perspective of increasing the fuel economy, wet-grip performance, and abrasion resistance in good balance, preferably at least two of $R^{21}$, $R^{22}$, and $R^{23}$ are hydrocarbyloxy groups, and more preferably the three of $R^{21}$, $R^{22}$, and $R^{23}$ are hydrocarbyloxy groups.

The silicon compound having both a group represented by formula (IX) and a group represented by formula (XI) can be exemplified by silicon compounds having a group with the following formula (IXa):

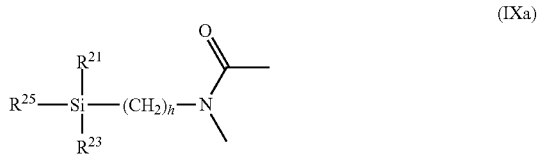

(in the formula, h represents an integer from 1 to 10; and $R^{24}$, $R^{25}$, and $R^{26}$ each independently represent a $C_{1-4}$ hydrocarbyl group or a $C_{1-4}$ hydrocarbyloxy group, and at least one of $R^{24}$, $R^{25}$, and $R^{26}$ is a hydrocarbyloxy group).

h represents an integer from 1 to 10. h is preferably at least 2 when viewed from the perspective of increasing the fuel economy, wet-grip performance, and abrasion resistance in good balance, while h is preferably not more than 4 when viewed from the perspective of improving the economics of production. h is particularly preferably 3.

Exemplary groups and preferred groups for $R^{24}$, $R^{25}$, and $R^{26}$ are the same as the exemplary groups and preferred groups provided above for $R^{21}$, $R^{22}$, and $R^{23}$ in formula (XI).

The silicon compound having a group represented by formula (IXa) can be exemplified by compounds with the following formula (IXb) and compounds with the following formula (IXc):

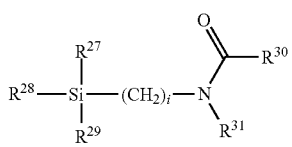

(IXb)

(in the formula, i represents an integer from 1 to 10; $R^{27}$, $R^{28}$, and $R^{29}$ each independently represent a $C_{1-4}$ hydrocarbyl group or a $C_{1-4}$ hydrocarbyloxy group, and at least one of $R^{27}$, $R^{28}$, and $R^{29}$ is a hydrocarbyloxy group; and $R^{30}$ and $R^{31}$ each independently represent a $C_{1-10}$ hydrocarbyl group, a $C_{1-10}$ substituted hydrocarbyl group, a $C_{1-10}$ hydrocarbyloxy group, or a $C_{1-10}$ substituted hydrocarbyloxy group, and $R^{30}$ and $R^{31}$ may be bonded to each other)

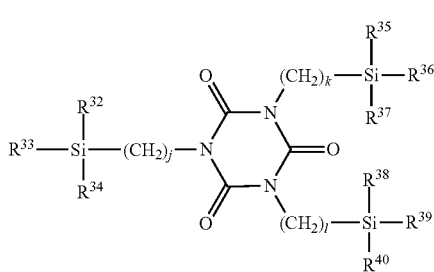

(IXc)

(in the formula, j, k, and l each independently represent an integer from 1 to 10; $R^{32}$ to $R^{40}$ each independently represent a $C_{1-4}$ hydrocarbyl group or a $C_{1-4}$ hydrocarbyloxy group; at least one of $R^{32}$, $R^{33}$, and $R^{34}$ is a hydrocarbyloxy group; at least one of $R^{35}$, $R^{36}$, and $R^{37}$ is a hydrocarbyloxy group; and at least one of $R^{38}$, $R^{39}$, and $R^{40}$ is a hydrocarbyloxy group).

i in formula (IXb) represents an integer from 1 to 10. i is preferably at least 2 when viewed from the perspective of increasing the fuel economy, wet-grip performance, and abrasion resistance in good balance, while i is preferably not more than 4 when viewed from the perspective of improving the economics of production. i is particularly preferably 3.

The hydrocarbyl groups encompassed by $R^{27}$, $R^{28}$, and $R^{29}$ in formula (IXb) can be exemplified by alkyl groups such as methyl, ethyl, n-propyl, isopropyl, n-butyl, sec-butyl, and tert-butyl. The hydrocarbyloxy groups encompassed by $R^{27}$, $R^{28}$, and $R^{29}$ can be exemplified by alkoxy groups such as methoxy, ethoxy, n-propoxy, isopropoxy, n-butoxy, sec-butoxy, and t-butoxy.

The hydrocarbyl group for $R^{27}$, $R^{28}$, and $R^{29}$ is preferably an alkyl group, more preferably a $C_{1-3}$ alkyl group, and even more preferably a methyl or ethyl group. The hydrocarbyloxy group for $R^{27}$, $R^{28}$, and $R^{29}$ is preferably an alkoxy group, more preferably a $C_{1-3}$ alkoxy group, and even more preferably a methoxy or ethoxy group.

With regard to $R^{27}$, $R^{28}$, and $R^{29}$, when viewed from the perspective of increasing the fuel economy, wet-grip performance, and abrasion resistance in good balance, preferably at least two of $R^{27}$, $R^{28}$, and $R^{29}$ are hydrocarbyloxy groups, and more preferably the three of $R^{27}$, $R^{28}$, and $R^{29}$ are hydrocarbyloxy groups.

The hydrocarbyl groups encompassed by $R^{30}$ and $R^{31}$ can be exemplified by alkyl groups such as methyl, ethyl, n-propyl, isopropyl, n-butyl, sec-butyl, and tert-butyl.

The substituted hydrocarbyl groups encompassed by $R^{30}$ and $R^{31}$ can be exemplified by substituted hydrocarbyl groups having as a substituent at least one type of group selected from the group consisting of nitrogen atom-bearing groups, oxygen atom-bearing groups, and silicon atom-bearing groups. The group having a nitrogen atom-bearing group as a substituent can be exemplified by dialkylaminoalkyl groups such as dimethylaminoethyl and diethylaminoethyl; the group having an oxygen atom-bearing group as a substituent can be exemplified by alkoxyalkyl groups such as methoxymethyl, methoxyethyl, ethoxymethyl, and ethoxyethyl; and the group having a silicon atom-bearing group as a substituent can be exemplified by trialkylsilylalkyl groups such as trimethylsilylmethyl and triethylsilylmethyl.

The hydrocarbyloxy groups encompassed by $R^{30}$ and $R^{31}$ can be exemplified by alkoxy groups such as methoxy, ethoxy, n-propoxy, isopropoxy, n-butoxy, sec-butoxy, and t-butoxy. The substituted hydrocarbyloxy groups encompassed by $R^{30}$ and $R^{31}$ can be exemplified by alkoxyalkoxy groups such as methoxymethoxy, methoxyethoxy, ethoxymethoxy, and ethoxyethoxy.

The group in which $R^{30}$ and $R^{31}$ are bonded to each other can be exemplified by $C_{2-12}$ divalent groups optionally having at least one type of atom selected from the group of atoms consisting of a nitrogen atom, oxygen atom, and silicon atom. Examples thereof include alkylene groups such as trimethylene, tetramethylene, pentamethylene, and hexamethylene; oxydialkylene groups such as oxydiethylene and oxydipropylene; and nitrogenous groups such as the group represented by —$CH_2CH_2$—NH—$CH_2$— and the group represented by —$CH_2CH_2$—N=CH—.

$R^{30}$ is preferably an alkyl group, more preferably a $C_{1-4}$ alkyl group, and even more preferably a methyl or ethyl group.

$R^{31}$ is preferably an alkyl group, more preferably a $C_{1-4}$ alkyl group, and even more preferably a methyl or ethyl group.

j, k, and l in formula (IXc) each independently represent an integer from 1 to 10. At least 2 is preferred when viewed from the perspective of increasing the fuel economy, wet-grip performance, and abrasion resistance in good balance, while not more than 4 is preferred when viewed from the perspective of improving the economics of production. 3 is particularly preferred.

The hydrocarbyl groups encompassed by $R^{32}$ to $R^{40}$ in formula (IXc) can be exemplified by alkyl groups such as methyl, ethyl, n-propyl, isopropyl, n-butyl, sec-butyl, and tert-butyl. The hydrocarbyloxy groups encompassed by $R^{32}$ to $R^{40}$ can be exemplified by alkoxy groups such as methoxy, ethoxy, n-propoxy, isopropoxy, n-butoxy, sec-butoxy, and t-butoxy.

The hydrocarbyl group for $R^{32}$ to $R^{40}$ is preferably an alkyl group, more preferably a $C_{1-3}$ alkyl group, and even more preferably a methyl or ethyl group. The hydrocarbyloxy group for $R^{32}$ to $R^{40}$ is preferably an alkoxy group, more preferably a $C_{1-3}$ alkoxy group, and even more preferably a methoxy or ethoxy group.

With regard to $R^{32}$, $R^{33}$, and $R^{34}$, when viewed from the perspective of increasing the fuel economy, wet-grip performance, and abrasion resistance in good balance, preferably at least two of $R^{32}$, $R^{33}$, and $R^{34}$ are hydrocarbyloxy groups, and more preferably the three of $R^{32}$, $R^{33}$, and $R^{34}$ are hydrocarbyloxy groups. With regard to $R^{35}$, $R^{36}$, and $R^{37}$, when viewed from the perspective of increasing the fuel economy, wet-grip performance, and abrasion resistance in good balance, preferably at least two of $R^{35}$, $R^{36}$, and $R^{37}$ are hydrocarbyloxy groups, and more preferably the three of $R^{35}$, $R^{36}$, and $R^{37}$ are hydrocarbyloxy groups. With regard to $R^{38}$, $R^{39}$, and $R^{40}$, when viewed from the perspective of increasing the fuel economy, wet-grip performance, and abrasion resistance in good balance, preferably at least two of $R^{38}$, $R^{39}$, and $R^{40}$ are hydrocarbyloxy groups, and more preferably the three of $R^{38}$, $R^{39}$, and $R^{40}$ are hydrocarbyloxy groups.

The compound represented by formula (IXb) can be exemplified by N-alkyl-N-trialkoxysilylalkyl-substituted carboxylic acid amides such as
N-alkyl-N-trialkoxysilylalkylacetamides, e.g.,
N-methyl-N-(trimethoxysilylmethyl)acetamide,
N-methyl-N-(triethoxysilylmethyl)acetamide,
N-methyl-N-(2-trimethoxysilylethyl)acetamide,
N-methyl-N-(2-triethoxysilylethyl)acetamide,
N-methyl-N-(3-trimethoxysilylpropyl)acetamide, and
N-methyl-N-(3-triethoxysilylpropyl)acetamide; and
N-alkyl-N-trialkoxysilylalkylpropionamides, e.g.,
N-methyl-N-(trimethoxysilylmethyl)propionamide,
N-methyl-N-(triethoxysilylmethyl)propionamide,
N-methyl-N-(2-trimethoxysilylethyl)propionamide,
N-methyl-N-(2-triethoxysilylethyl)propionamide,
N-methyl-N-(3-trimethoxysilylpropyl)propionamide, and
N-methyl-N-(3-triethoxysilylpropyl)propionamide.

The compound represented by formula (IXb) is preferably an N-alkyl-N-trialkoxysilylalkyl-substituted carboxylic acid amide, more preferably an N-alkyl-N-trialkoxysilylalkylpropionamide, and even more preferably N-methyl-N-(3-trimethoxysilylpropyl)propionamide or N-methyl-N-(3-triethoxysilylpropyl)propionamide.

The compound represented by formula (IXc) can be exemplified by 1,3,5-tris(trialkoxysilylalkyl)isocyanurates such as
1,3,5-tris(trimethoxysilylmethyl)isocyanurate,
1,3,5-tris(triethoxysilylmethyl)isocyanurate,
1,3,5-tris(trimethoxysilylethyl)isocyanurate,
1,3,5-tris(triethoxysilylethyl)isocyanurate,
1,3,5-tris(3-trimethoxysilylpropyl)isocyanurate, and
1,3,5-tris(3-triethoxysilylpropyl)isocyanurate.

The compound represented by formula (IXc) is preferably 1,3,5-tris(3-trimethoxysilylpropyl)isocyanurate or 1,3,5-tris(3-triethoxysilylpropyl)isocyanurate.

The silicon compound having both a group represented by formula (X) and a group represented by formula (XI) can be exemplified by silicon compounds with the following formula (Xa):

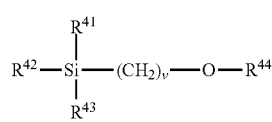

(in the formula, v represents an integer from 1 to 10; $R^{41}$, $R^{42}$, and $R^{43}$ each independently represent a $C_{1-4}$ hydrocarbyl group or a $C_{1-4}$ hydrocarbyloxy group, and at least one of $R^{41}$, $R^{42}$, and $R^{43}$ represents a hydrocarbyloxy group; and $R^{44}$ represents a $C_{1-10}$ hydrocarbyl group or a $C_{1-10}$ substituted hydrocarbyl group).

v in formula (Xa) represents an integer from 1 to 10. v is preferably at least 2 from the perspective of increasing the fuel economy, wet-grip performance, and abrasion resistance in good balance, and is preferably not more than 4 from the perspective of improving the economics of production. 3 is particularly preferred for v.

The hydrocarbyl groups encompassed by $R^{41}$, $R^{42}$, and $R^{43}$ in formula (Xa) can be exemplified by alkyl groups such as methyl, ethyl, n-propyl, isopropyl, n-butyl, sec-butyl, and tert-butyl. The hydrocarbyloxy groups encompassed by $R^{41}$, $R^{42}$, and $R^{43}$ can be exemplified by alkoxy groups such as methoxy, ethoxy, n-propoxy, isopropoxy, n-butoxy, sec-butoxy, and t-butoxy.

The hydrocarbyl group for $R^{41}$, $R^{42}$, and $R^{43}$ is preferably an alkyl group, more preferably a $C_{1-3}$ alkyl group, and even more preferably a methyl or ethyl group. The hydrocarbyloxy group for $R^{41}$, $R^{42}$, and $R^{43}$ is preferably an alkoxy group, more preferably a $C_{1-3}$ alkoxy group, and even more preferably a methoxy or ethoxy group.

With regard to $R^{41}$, $R^{42}$, and $R^{43}$, when viewed from the perspective of increasing the fuel economy, wet-grip performance, and abrasion resistance in good balance, preferably at least two of $R^{41}$, $R^{42}$, and $R^{43}$ are hydrocarbyloxy groups, and more preferably the three of $R^{41}$, $R^{42}$, and $R^{43}$ are hydrocarbyloxy groups.

The hydrocarbyl group encompassed by $R^{44}$ can be exemplified by alkyl groups such as methyl, ethyl, n-propyl, isopropyl, n-butyl, sec-butyl, and tert-butyl groups.

The substituted hydrocarbyl group encompassed by $R^{44}$ can be exemplified by substituted hydrocarbyl groups that have as a substituent at least one type of group selected from the group consisting of nitrogen atom-bearing groups, oxygen atom-bearing groups, and silicon atom-bearing groups. The group that has a nitrogen atom-bearing group as a substituent can be exemplified by dialkylaminoalkyl groups such as dimethylaminoethyl and diethylaminoethyl. The group that has an oxygen atom-bearing group as a substituent can be exemplified by alkoxyalkyl groups such as methoxymethyl, methoxyethyl, ethoxymethyl, and ethoxyethyl; and alkylene oxide alkyl groups such as glycidyl and tetrahydrofurfuryl. The group that has a silicon atom-bearing group as a substituent can be exemplified by trialkylsilylalkyl groups such as trimethylsilylmethyl.

As used herein, the term "alkylene oxide alkyl group" denotes a group provided by substituting at least one hydrogen atom of an alkyl group with an alkylene oxide group.

$R^{44}$ is preferably an alkylene oxide alkyl group and more preferably a glycidyl group or tetrahydrofurfuryl group.

The compound represented by formula (Xa) in which $R^{44}$ is an alkyl group can be exemplified by
3-(alkoxy)propyltrialkoxysilanes such as
3-(methoxy)propyltrimethoxysilane,
3-(ethoxy)propyltrimethoxysilane,
3-(n-propoxy)propyltrimethoxysilane,
3-(isopropoxy)propyltrimethoxysilane,
3-(n-butoxy)propyltrimethoxysilane,
3-(sec-butoxy)propyltrimethoxysilane, and
3-(t-butoxy)propyltrimethoxysilane.

The compound represented by formula (Xa) in which $R^{44}$ is an alkylene oxide alkyl group can be exemplified by glycidoxyalkyltrialkoxysilanes such as
2-glycidoxyethyltrimethoxysilane,
3-glycidoxypropyltrimethoxysilane,
2-glycidoxyethyltriethoxysilane, and 3-glycidoxypropyltriethoxysilane; and
tetrahydrofurfuryloxyalkyltrialkoxysilanes such as
2-tetrahydrofurfuryloxyethyltrimethoxysilane,
3-tetrahydrofurfuryloxypropyltrimethoxysilane,
2-tetrahydrofurfuryloxyethyltriethoxysilane, and
3-tetrahydrofurfuryloxypropyltriethoxysilane.

The compound represented by formula (Xa) in which $R^{44}$ is an alkoxyalkyl group can be exemplified by
3-(alkoxyalkoxy)propyltrialkoxysilanes such as
3-(methoxymethoxy)propyltrimethoxysilane,
3-(methoxyethoxy)propyltrimethoxysilane,
3-(ethoxymethoxy)propyltrimethoxysilane,
3-(ethoxyethoxy)propyltrimethoxysilane, 3-(methoxymethoxy)propyltriethoxysilane,
3-(methoxyethoxy)propyltriethoxysilane,
3-(ethoxymethoxy)propyltriethoxysilane, and
3-(ethoxyethoxy)propyltriethoxysilane.

The compound represented by formula (Xa) is preferably a compound in which $R^{44}$ is an alkylene oxide alkyl group, and more preferably
3-glycidoxypropyltrimethoxysilane,
3-glycidoxypropyltriethoxysilane,
3-tetrahydrofurfuryloxypropyltrimethoxysilane, or
3-tetrahydrofurfuryloxypropyltriethoxysilane.

The silicon compound that has a group represented by formula (IX) plus a group represented by formula (X) plus a group represented by formula (XI) can be exemplified by
acryloxyalkyltrialkoxysilanes and
methacryloxyalkyltrialkoxysilanes.

The acryloxyalkyltrialkoxysilane can be exemplified by 3-acryloxypropyltrialkoxysilanes such as
3-acryloxypropyltrimethoxysilane and
3-acryloxypropyltriethoxysilane.

The methacryloxyalkyltrialkoxysilane can be exemplified by 3-methacryloxypropyltrialkoxysilanes such as
3-methacryloxypropyltrimethoxysilane and
3-methacryloxypropyltriethoxysilane.

The silicon compound that has a group represented by formula (IX) plus a group represented by formula (X) plus a group represented by formula (XI) can be further exemplified by trialkoxysilylalkylsuccinic anhydrides and trialkoxysilylalkylmaleic anhydrides.

The trialkoxysilylalkylsuccinic anhydride can be exemplified by 3-trialkoxysilylpropylsuccinic anhydrides such as 3-trimethoxysilylpropylsuccinic anhydride and 3-triethoxysilylpropylsuccinic anhydride.

The trialkoxysilylalkylmaleic anhydride can be exemplified by 3-trialkoxysilylpropylmaleic anhydrides such as 3-trimethoxysilylpropylmaleic anhydride and 3-triethoxysilylpropylmaleic anhydride.

Compounds having a group represented by formula (XII) below (modifying agent 5) are also suitable examples of the aforementioned modifying agent.

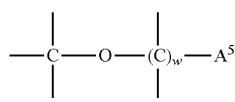

(XII)

(in the formula, w is an integer from 1 to 11 and $A^5$ is a nitrogen atom-bearing functional group).

w represents an integer from 1 to 11 and is preferably at least 1 when viewed from the standpoint of increasing the fuel economy, wet-grip performance, and abrasion resistance in good balance, but is preferably not more than 4 when viewed from the standpoint of improving the economics of production. $A^5$ is a nitrogen atom-bearing functional group and can be exemplified by amino, isocyano, cyano, pyridyl, piperidyl, pyrazinyl, and morpholino.

The compound having a group represented by formula (XII) can be exemplified by compounds with the following formula (XIII):

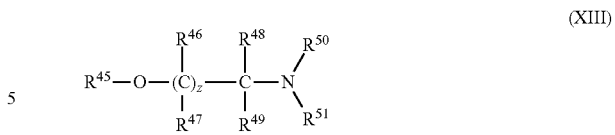

(XIII)

(in the formula, z represents an integer from 0 to 10; $R^{45}$ represents a $C_{1-5}$ hydrocarbyl group; $R^{46}$, $R^{47}$, $R^{48}$, and $R^{49}$ each independently represent a hydrogen atom or a $C_{1-5}$ hydrocarbyl group, $C_{1-5}$ substituted hydrocarbyl group, or $C_{1-5}$ hydrocarbyloxy group; when a plurality of $R^{46}$'s are present, the plurality of $R^{46}$'s may be the same as each other or may differ from one another, and when a plurality of $R^{47}$'s are present, the plurality of $R^{47}$'s may be the same as each other or may differ from one another; $R^{50}$ and $R^{51}$ each independently represent a $C_{1-6}$ group optionally having at least one type of atom selected from the group of atoms consisting of a nitrogen atom, oxygen atom, and silicon atom; $R^{50}$ and $R^{51}$ may be bonded to each other to form a cyclic structure together with the nitrogen atom; and $R^{50}$ and $R^{51}$ may be a single group bonded to the nitrogen by a double bond).

z in formula (XIII) represents an integer from 0 to 10. Viewed from the standpoint of improving the economics, z is preferably not more than 3 and more preferably 0.

$R^{45}$ in formula (XIII) represents a $C_{1-5}$ hydrocarbyl group. The hydrocarbyl group for $R^{45}$ can be exemplified by alkyl groups such as methyl, ethyl, n-propyl, isopropyl, n-butyl, sec-butyl, and t-butyl.

The hydrocarbyl group for $R^{45}$ is preferably an alkyl group, more preferably a $C_{1-4}$ alkyl group, and even more preferably a methyl or ethyl group.

$R^{46}$ to $R^{49}$ in formula (XIII) each independently represent a hydrogen atom or a $C_{1-5}$ hydrocarbyl group, $C_{1-5}$ substituted hydrocarbyl group, or $C_{1-5}$ hydrocarbyloxy group; when a plurality of $R^{46}$'s are present, the plurality of $R^{46}$'s may be the same as each other or may differ from one another, and when a plurality of $R^{47}$'s are present, the plurality of $R^{47}$'s may be the same as each other or may differ from one another.

The hydrocarbyl groups encompassed by $R^{46}$ to $R^{49}$ can be exemplified by alkyl groups such as methyl, ethyl, n-propyl, isopropyl, n-butyl, sec-butyl, and t-butyl.

The substituted hydrocarbyl groups encompassed by $R^{46}$ to $R^{49}$ can be exemplified by substituted hydrocarbyl groups having as a substituent at least one type of group selected from the group consisting of nitrogen atom-bearing groups and oxygen atom-bearing groups. The group having a nitrogen atom-bearing group as a substituent can be exemplified by dialkylaminoalkyl groups such as dimethylaminoethyl and diethylaminoethyl, while the group having an oxygen atom-bearing group as a substituent can be exemplified by alkoxyalkyl groups such as methoxymethyl, methoxyethyl, ethoxymethyl, and ethoxyethyl.

The hydrocarbyloxy groups encompassed by $R^{46}$ to $R^{49}$ can be exemplified by alkoxy groups such as methoxy, ethoxy, n-propoxy, isopropoxy, n-butoxy, sec-butoxy, and t-butoxy.

The hydrocarbyl group for $R^{46}$ to $R^{49}$ is preferably an alkyl group, more preferably a $C_{1-4}$ alkyl group, and even more preferably a methyl or ethyl group.

The substituted hydrocarbyl group for $R^{46}$ to $R^{49}$ is preferably an alkoxyalkyl group, more preferably a $C_{1-4}$ alkoxyalkyl group, and even more preferably a methoxymethyl or ethoxyethyl group.

The hydrocarbyloxy group for $R^{46}$ to $R^{49}$ is preferably an alkoxy group, more preferably a $C_{1-3}$ alkoxy group, and even more preferably a methoxy or ethoxy group.

Viewed from an economic perspective and from the perspective of increasing the fuel economy, wet-grip performance, and abrasion resistance in good balance, preferably one of $R^{48}$ and $R^{49}$ is a hydrogen atom. More preferably, one of $R^{48}$ and $R^{49}$ is a hydrogen atom and the other is an alkyl group or alkoxy group. Even more preferably, one of $R^{48}$ and $R^{49}$ is a hydrogen atom and the other is an alkoxy group. Methoxy and ethoxy groups are particularly preferred.

$R^{50}$ and $R^{51}$ in formula (XIII) each independently represent a $C_{1-6}$ group optionally having at least one type of atom selected from the group of atoms consisting of a nitrogen atom, oxygen atom, and silicon atom; $R^{50}$ and $R^{51}$ may be bonded to each other to form a cyclic structure together with the nitrogen atom; and $R^{50}$ and $R^{51}$ may be a single group bonded to the nitrogen by a double bond.

$R^{50}$ and $R^{51}$ in formula (XIII) can be exemplified by 6 hydrocarbyl groups, $C_{1-6}$ substituted hydrocarbyl groups, and substituted silyl groups.

The hydrocarbyl groups encompassed by $R^{50}$ and $R^{51}$ can be exemplified by alkyl groups such as methyl, ethyl, n-propyl, isopropyl, n-butyl, sec-butyl, tert-butyl, n-pentyl, neopentyl, isopentyl, and n-hexyl; cycloalkyl groups such as cyclohexyl; and a phenyl group.

The substituted hydrocarbyl groups encompassed by $R^{50}$ and $R^{51}$ can be exemplified by substituted hydrocarbyl groups that have as a substituent at least one type of group selected from the group consisting of nitrogen atom-bearing groups, oxygen atom-bearing groups, and silicon atom-bearing groups. The group that has a nitrogen atom-bearing group as a substituent can be exemplified by dialkylaminoalkyl groups such as dimethylaminoethyl and diethylaminoethyl. The group that has an oxygen atom-bearing group as a substituent can be exemplified by alkoxyalkyl groups such as methoxymethyl, methoxyethyl, ethoxymethyl, and ethoxyethyl; alkylene oxide groups such as epoxy and tetrahydrofuranyl; and alkylene oxide alkyl groups such as glycidyl and tetrahydrofurfuryl. The group that has a silicon atom-bearing group as a substituent can be exemplified by trialkylsilylalkyl groups such as trimethylsilylmethyl.

As used herein, the term "alkylene oxide group" denotes a monovalent group provided by removing a hydrogen atom from the ring of a cyclic ether compound, while the term "alkylene oxide alkyl group" denotes a group provided by substituting at least one hydrogen atom in an alkyl group with an alkylene oxide group.

The substituted silyl groups encompassed by $R^{50}$ and $R^{51}$ can be exemplified by trialkylsilyl groups such as trimethylsilyl, triethylsilyl, and t-butyldimethylsilyl; and trialkoxysilyl groups such as trimethoxysilyl.

The group in which $R^{50}$ and $R^{51}$ are bonded to each other can be exemplified by $C_{2-12}$ divalent groups optionally having at least one type of atom selected from the group of atoms consisting of a nitrogen atom, oxygen atom, and silicon atom. Examples thereof include alkylene groups such as trimethylene, tetramethylene, pentamethylene, and hexamethylene; oxydialkylene groups such as oxydiethylene and oxydipropylene; and nitrogenous groups such as the group represented by —CH$_2$CH$_2$—NH—CH$_2$— and the group represented by —CH$_2$CH$_2$—N=CH—.

The group in which $R^{50}$ and $R^{51}$ are bonded to each other is preferably a nitrogenous group and more preferably the group represented by —CH$_2$CH$_2$—NH—CH$_2$— or the group represented by —CH$_2$CH$_2$—N=CH—.

The single group bonded to the nitrogen by a double bond and encompassed by $R^{50}$ and $R^{51}$ can be exemplified by $C_{2-12}$ divalent groups optionally having at least one type of atom selected from the group of atoms consisting of a nitrogen atom, oxygen atom, and silicon atom. Examples thereof include an ethylidene group, 1-methylpropylidene group, 1,3-dimethylbutylidene group, 1-methylethylidene group, and 4-N,N-dimethylaminobenzylidene group.

The hydrocarbyl group for $R^{50}$ and $R^{51}$ is preferably an alkyl group; more preferably a $C_{1-4}$ alkyl group; even more preferably a methyl, ethyl, n-propyl, or n-butyl group; and still more preferably a methyl or ethyl group. The substituted hydrocarbyl group for $R^{50}$ and $R^{51}$ is preferably an alkoxyalkyl group, alkylene oxide group, or alkylene oxide alkyl group. The substituted silyl group for $R^{50}$ and $R^{51}$ is preferably a trialkylsilyl or trialkoxysilyl group, more preferably a trialkylsilyl group, and even more preferably a trimethylsilyl or triethylsilyl group.

$R^{50}$ and $R^{51}$ are, independently, preferably an alkyl, alkoxyalkyl, or substituted silyl group, or are preferably a nitrogenous group in which $R^{50}$ and $R^{51}$ are bonded to each other. $R^{50}$ and $R^{51}$ are, independently, more preferably a $C_{1-4}$ alkyl group; even more preferably a methyl, ethyl, n-propyl, or n-butyl group; and still more preferably a methyl or ethyl group.

Acyclic amino groups and cyclic amino groups are examples of the amino group in which $R^{50}$ and $R^{51}$ are bonded to the nitrogen atom.

The acyclic amino group can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino; di(alkoxyalkyl)amino groups such as di(methoxymethyl)amino, di(methoxyethyl)amino, di(ethoxymethyl)amino, and di(ethoxyethyl)amino; and di(trialkylsilyl)amino groups such as di(trimethylsilyl)amino and di(t-butyldimethylsilyl)amino. Other examples are di(alkylene oxide)amino groups such as di(epoxy)amino and di(tetrahydrofuranyl)amino; and di(alkylene oxide alkyl) amino groups such as di(glycidyl)amino and di(tetrahydrofurfuryl)amino. Additional examples are an ethylideneamino group, 1-methylpropylideneamino group, 1,3-dimethylbutylideneamino group, 1-methylethylideneamino group, and 4-N,N-dimethylaminobenzylideneamino group.

The cyclic amino group can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino. The cyclic amino group can also be exemplified by 1-imidazolyl, 4,5-dihydro-1-imidazolyl, 1-imidazolidinyl, 1-piperazinyl, and morpholino groups.

Viewed from the perspective of the fuel economy, wet-grip performance, abrasion resistance, and long-term stability and easy availability of the compound, the amino group in which $R^{50}$ and $R^{51}$ are bonded to the nitrogen atom is preferably an acyclic amino group, is more preferably a dialkylamino group, and is even more preferably a dimethylamino or diethylamino group.

The compound represented by formula (XIII) can be exemplified by N,N-dialkyl-substituted carboxylic acid amide dialkyl acetal compounds.

The N,N-dialkyl-substituted carboxylic acid amide dialkyl acetal compound can be exemplified by N,N-dialkylformamide dialkyl acetals such as
N,N-dimethylformamide dimethyl acetal,
N,N-diethylformamide dimethyl acetal,
N,N-di(n-propyl)formamide dimethyl acetal, N,N-dimethylformamide diethyl acetal,
N,N-diethylformamide diethyl acetal,
N,N-di(n-propyl)formamide diethyl acetal,
N,N-dimethylformamide ethyl methyl acetal,
N,N-diethylformamide ethyl methyl acetal, and
N,N-di(n-propyl)formamide ethyl methyl acetal;
N,N-dialkylacetamide dialkyl acetals such as
N,N-dimethylacetamide dimethyl acetal,
N,N-diethylacetamide dimethyl acetal,
N,N-di(n-propyl)acetamide dimethyl acetal,
N,N-dimethylacetamide diethyl acetal,
N,N-diethylacetamide diethyl acetal,
N,N-di(n-propyl)acetamide diethyl acetal,
N,N-dimethylacetamide ethyl methyl acetal,
N,N-diethylacetamide ethyl methyl acetal, and
N,N-di(n-propyl)acetamide ethyl methyl acetal; and
N,N-dialkylpropionamide dialkyl acetals such as
N,N-dimethylpropionamide dimethyl acetal,
N,N-diethylpropionamide dimethyl acetal,
N,N-di(n-propyl)propionamide dimethyl acetal,
N,N-dimethylpropionamide diethyl acetal,
N,N-diethylpropionamide diethyl acetal,
N,N-di(n-propyl)propionamide diethyl acetal,
N,N-dimethylpropionamide ethyl methyl acetal,
N,N-diethylpropionamide ethyl methyl acetal, and
N,N-di(n-propyl)propionamide ethyl methyl acetal.

Viewed from the perspective of increasing the fuel economy, wet-grip performance, and abrasion resistance in good balance, N,N-dialkylformamide dialkyl acetals are preferred among the preceding and
N,N-dimethylformamide dimethyl acetal,
N,N-diethylformamide dimethyl acetal,
N,N-dimethylformamide diethyl acetal, and
N,N-diethylformamide diethyl acetal
are more preferred.

In addition to the conjugated diene-based constituent unit (conjugated diene unit), the conjugated diene polymer may also have a constituent unit based on another monomer. This other monomer can be exemplified by aromatic vinyls, vinyl nitriles, and unsaturated carboxylic acid esters. The aromatic vinyl can be exemplified by styrene, α-methylstyrene, vinyltoluene, vinylnaphthalene, divinylbenzene, trivinylbenzene, and divinylnaphthalene. The vinyl nitrile can be exemplified by acrylonitrile, and the unsaturated carboxylic acid ester can be exemplified by methyl acrylate, ethyl acrylate, methyl methacrylate, and ethyl methacrylate. Aromatic vinyls are preferred among the preceding, and styrene is more preferred.

The conjugated diene polymer preferably has an aromatic vinyl-based constituent unit (aromatic vinyl unit) based on a consideration of the abrasion resistance. In this case, letting the sum of the conjugated diene unit and aromatic vinyl unit be 100% by mass, the aromatic vinyl unit content is preferably at least 10% by mass (the conjugated diene unit content is not more than 90% by mass) and more preferably at least 15% by mass (the conjugated diene unit content is not more than 85% by mass). Viewed in terms of fuel economy, the aromatic vinyl unit content is preferably not more than 50% by mass (the conjugated diene unit content is at least 50% by mass) and more preferably not more than 45% by mass (the conjugated diene unit content is at least 55% by mass).

Letting the conjugated diene unit content be 100 mol %, the vinyl bond content in the conjugated diene polymer, viewed from the perspective of the fuel economy, is preferably not more than 80 mol % and more preferably not more than 70 mol %. In addition, when viewed in terms of the wet-grip performance, the vinyl bond content is preferably at least 10 mol %, more preferably at least 15 mol %, even more preferably at least 20 mol %, and particularly preferably at least 40 mol %. The vinyl bond content can be determined by infrared spectroscopic analysis from the intensity of the absorption in the vicinity of 910 cm$^{-1}$, which is an absorption peak for the vinyl group.

The molecular weight distribution of the conjugated diene polymer, viewed from the standpoint of the fuel economy, is preferably 1 to 5 and is more preferably 1 to 2. The molecular weight distribution can be determined by measuring the number-average molecular weight (Mn) and the weight-average molecular weight (Mw) by gel permeation chromatography (GPC) and dividing Mw by Mn.

There are no particular limitations on the polymerization method for the conjugated diene polymer, and solution polymerization, gas-phase polymerization, and bulk polymerization can be used. However, solution polymerization is particularly preferred from the standpoint of, inter alia, the processability and the flexibility of polymer design. Batch methods and continuous methods may be used for the polymerization.

When, for example, production is carried out by a solution polymerization method, the conjugated diene polymer can be obtained by reacting monomers comprising a conjugated diene and a vinyl compound represented by the following formula (XIV) in a hydrocarbon solvent in the presence of an alkali metal catalyst for polymerization and additionally reacting a modifying agent with the polymer terminal:

(XIV)

(in the formula, $X^4$, $X^5$, and $X^6$ each independently represent a group with the following formula (XIVa), a hydrocarbyl group, or a substituted hydrocarbyl group, and at least one of $X^4$, $X^5$, and $X^6$ is a group with the following formula (XIVa):

(XIVa)

(in the formula, $R^{52}$ and $R^{53}$ each independently represent a $C_{1-6}$ hydrocarbyl group, a $C_{1-6}$ substituted hydrocarbyl group, a silyl group, or a substituted silyl group, and $R^{52}$ and $R^{53}$ may be bonded to each other to form a cyclic structure together with the nitrogen atom)).

The alkali metal catalyst used in solution polymerization methods can be exemplified by alkali metals, organoalkali metal compounds, alkali metal/polar compound complexes, and alkali metal-containing oligomers. The alkali metal can be exemplified by lithium, sodium, potassium, rubidium, and cesium. The organoalkali metal compound can be exemplified by ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. The alkali metal/polar compound complex can be exemplified by a potassium-tetrahydrofuran complex and a potassium-diethoxyethane complex. The alkali metal-containing oligomer can be exemplified by a sodium salt of α-methylstyrene tetramer. Organolithium compounds and organosodium compounds are preferred among the preceding, and $C_{2-20}$ organolithium compounds or organosodium compounds are more preferred.

The hydrocarbon solvent used by solution polymerization methods is a solvent that does not deactivate an alkali metal compound catalyst and can be exemplified by aliphatic hydrocarbons, aromatic hydrocarbons, and alicyclic hydrocarbons. The aliphatic hydrocarbon can be exemplified by propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. The aromatic hydrocarbon can be exemplified by benzene, toluene, xylene, and ethylbenzene. The alicyclic hydrocarbon can be exemplified by cyclopentane and cyclohexane. A single one of these may be used or two or more may be used in combination. $C_{2-12}$ hydrocarbons are preferred among the preceding.

Monomers comprising a conjugated diene and a vinyl compound represented by formula (XIV) are polymerized in solution polymerization to produce a conjugated diene polymer having an alkali metal originating from the above-described alkali metal catalyst at the polymer chain terminal. The conjugated diene can be exemplified by 1,3-butadiene, isoprene, 1,3-pentadiene, 2,3-dimethyl-1,3-butadiene, and 1,3-hexadiene. A single one of these may be used or two or more may be used in combination. Based on ease of availability, 1,3-butadiene and isoprene are preferred among the preceding.

$X^4$, $X^5$, and $X^6$ in formula (XIV) each independently represent a group represented by formula (XIVa), a hydrocarbyl group, or a substituted hydrocarbyl group, and at least one of $X^4$, $X^5$, and $X^6$ is a group represented by formula (XIVa).

$R^{52}$ and $R^{53}$ in formula (XIVa) each independently represent a $C_{1-6}$ hydrocarbyl group, a $C_{1-6}$ substituted hydrocarbyl group, a silyl group, or a substituted silyl group, and $R^{52}$ and $R^{53}$ may be bonded to each other to form a cyclic structure together with the nitrogen atom.

The $C_{1-6}$ hydrocarbyl groups encompassed by $R^{52}$ and $R^{53}$ can be exemplified by alkyl groups such as methyl, ethyl, n-propyl, isopropyl, n-butyl, sec-butyl, tert-butyl, n-pentyl, neopentyl, isopentyl, and n-hexyl; cycloalkyl groups such as cyclohexyl; and a phenyl group.

The $C_{1-6}$ substituted hydrocarbyl groups encompassed by $R^{52}$ and $R^{53}$ can be exemplified by substituted hydrocarbyl groups having as a substituent at least one type of group selected from the group consisting of nitrogen atom-bearing groups, oxygen atom-bearing groups, and silicon atom-bearing groups. The group having a nitrogen atom-bearing group as a substituent can be exemplified by dialkylaminoalkyl groups such as dimethylaminoethyl and diethylaminoethyl; the group having an oxygen atom-bearing group as a substituent can be exemplified by alkoxyalkyl groups such as methoxymethyl, methoxyethyl, ethoxymethyl, and ethoxyethyl; and the group having a silicon atom-bearing group as a substituent can be exemplified by trialkylsilylalkyl groups such as trimethylsilylmethyl.

The substituted silyl groups encompassed by $R^{52}$ and $R^{53}$ can be exemplified by trialkylsilyl groups such as trimethylsilyl, triethylsilyl, and t-butyldimethylsilyl.

The group in which $R^{52}$ and $R^{53}$ are bonded to each other can be exemplified by $C_{1-12}$ divalent groups optionally having at least one type of atom selected from the group of atoms consisting of a nitrogen atom, oxygen atom, and silicon atom. Examples thereof include alkylene groups such as trimethylene, tetramethylene, pentamethylene, and hexamethylene; oxydialkylene groups such as oxydiethylene and oxydipropylene; and nitrogenous groups such as the group represented by —CH$_2$CH$_2$—NH—CH$_2$— and the group represented by —CH$_2$CH$_2$—N═CH—.

The group in which $R^{52}$ and $R^{53}$ are bonded to each other is preferably a nitrogenous group and more preferably the group represented by —CH$_2$CH$_2$—NH—CH$_2$— or the group represented by —CH$_2$CH$_2$—N═CH—.

The hydrocarbyl group for $R^{52}$ and $R^{53}$ is preferably an alkyl group; more preferably a $C_{1-4}$ alkyl group; even more preferably a methyl, ethyl, n-propyl, or n-butyl group; and particularly preferably an ethyl or n-butyl group. The substituted hydrocarbyl group for $R^{52}$ and $R^{53}$ is preferably an alkoxyalkyl group and more preferably a $C_{1-4}$ alkoxyalkyl group. The substituted silyl group for $R^{52}$ and $R^{53}$ is preferably a trialkylsilyl group and more preferably a trimethylsilyl group.

$R^{52}$ and $R^{53}$ are, independently, preferably an alkyl, alkoxyalkyl, or substituted silyl group, or are a nitrogenous group in which $R^{52}$ and $R^{53}$ are bonded to each other. $R^{52}$ and $R^{53}$ are, independently, more preferably an alkyl group, even more preferably a $C_{1-4}$ alkyl group, and yet more preferably a methyl, ethyl, n-propyl, or n-butyl group.

The group represented by formula (XIVa) may be an acyclic amino group or a cyclic amino group.

The acyclic amino group can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino; di(alkoxyalkyl)amino groups such as di(methoxymethyl)amino, di(methoxyethyl)amino, di(ethoxymethyl)amino, and di(ethoxyethyl)amino; and di(trialkylsilyl)amino groups such as di(trimethylsilyl)amino and di(t-butyldimethylsilyl)amino.

The cyclic amino group can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino.

The cyclic amino group can also be exemplified by 1-imidazolyl, 4,5-dihydro-1-imidazolyl, 1-imidazolidinyl, 1-piperazinyl, and morpholino.

Viewed from the perspective of economics and ease of availability, the group represented by formula (XIVa) is preferably an acyclic amino group, more preferably a dialkylamino group, even more preferably a dialkylamino group which is substituted by a $C_{1-4}$ alkyl group, and yet more preferably a dimethylamino, diethylamino, di(n-propyl)amino, or di(n-butyl)amino group.

The hydrocarbyl groups encompassed by $X^4$, $X^5$, and $X^6$ in formula (XIV) can be exemplified by alkyl groups such as methyl, ethyl, n-propyl, isopropyl, n-butyl, sec-butyl, and tert-butyl.

The substituted hydrocarbyl groups can also be exemplified by alkoxyalkyl groups such as methoxymethyl, ethoxymethyl, methoxyethyl, and ethoxyethyl.

The hydrocarbyl group for $X^4$, $X^5$, and $X^6$ is preferably an alkyl group, more preferably a $C_{1-4}$ alkyl group, and even more preferably a methyl or ethyl group. The substituted hydrocarbyl group for $X^4$, $X^5$, and $X^6$ is preferably an alkoxyalkyl group and more preferably a $C_{1-4}$ alkoxyalkyl group.

With respect to the hydrocarbyl group and substituted hydrocarbyl group for $X^4$, $X^5$, and $X^6$, an alkyl or alkoxyalkyl group is preferred; a $C_{1-4}$ alkyl or $C_{1-4}$ alkoxyalkyl group is more preferred; a $C_{1-4}$ alkyl group is even more preferred; and a methyl or ethyl group is still more preferred.

At least one of $X^4$, $X^5$, and $X^6$ in formula (XIV) is a group represented by formula (XIVa). Preferably at least two of $X^4$, $X^5$, and $X^6$ in formula (XIV) are groups represented by formula (XIVa) and more preferably two of $X^4$, $X^5$, and $X^6$ in formula (XIV) are groups represented by formula (XIVa).

Examples of the vinyl compound of formula (XIV) that can be used in solution polymerization include compounds in which one of $X^4$, $X^5$, and $X^6$ is an acyclic amino group represented by formula (XIVa) and two of $X^4$, $X^5$, and $X^6$ are, independently, a hydrocarbyl group or substituted hydrocarbyl group, e.g.,
(dialkylamino)dialkylvinylsilanes,
{di(trialkylsilyl)amino}dialkylvinylsilanes, and
(dialkylamino) dialkoxyalkylvinylsilanes.

The (dialkylamino)dialkylvinylsilane can be exemplified by
(dimethylamino)dimethylvinylsilane,
(ethylmethylamino)dimethylvinylsilane,
(diethylamino)dimethylvinylsilane,
(ethyl-n-propylamino)dimethylvinylsilane,
(ethylisopropylamino)dimethylvinylsilane,
(di(n-propyl)amino)dimethylvinylsilane,
(diisopropylamino)dimethylvinylsilane,
(n-butyl-n-propylamino)dimethylvinylsilane,
(di(n-butyl)amino)dimethylvinylsilane,
(dimethylamino)diethylvinylsilane,
(ethylmethylamino)diethylvinylsilane,
(diethylamino)diethylvinylsilane,
(ethyl-n-propylamino) diethylvinylsilane,
(ethylisopropylamino)diethylvinylsilane,
(di(n-propyl)amino)diethylvinylsilane,
(diisopropylamino)diethylvinylsilane,
(n-butyl-n-propylamino) diethylvinylsilane,
(di(n-butyl)amino)diethylvinylsilane,
(dimethylamino)dipropylvinylsilane,
(ethylmethylamino)dipropylvinylsilane,
(diethylamino)dipropylvinylsilane,
(ethyl-n-propylamino)dipropylvinylsilane,
(ethylisopropylamino)dipropylvinylsilane,
(di(n-propyl)amino)dipropylvinylsilane,
(diisopropylamino)dipropylvinylsilane,
(n-butyl-n-propylamino)dipropylvinylsilane,
(di(n-butyl)amino)dipropylvinylsilane,
(dimethylamino)dibutylvinylsilane,
(ethylmethylamino)dibutylvinylsilane,
(diethylamino)dibutylvinylsilane,
(ethyl-n-propylamino)dibutylvinylsilane,
(ethylisopropylamino)dibutylvinylsilane,
(di(n-propyl)amino)dibutylvinylsilane,
(diisopropylamino)dibutylvinylsilane,
(n-butyl-n-propylamino)dibutylvinylsilane, and
(di(n-butyl)amino)dibutylvinylsilane.

The {di(trialkylsilyl)amino}dialkylvinylsilane can be exemplified by
{di-trimethylsilyl)amino}dimethylvinylsilane,
{di(t-butyldimethylsilyl)amino}dimethylvinylsilane,
(di(trimethylsilyl)amino)diethylvinylsilane, and
{di(t-butyldimethylsilyl)amino}diethylvinylsilane.

The (dialkylamino)dialkoxyalkylvinylsilane can be exemplified by
(dimethylamino) dimethoxymethylvinylsilane,
(dimethylamino)dimethoxyethylvinylsilane,
(dimethylamino) diethoxymethylvinylsilane,
(dimethylamino)diethoxyethylvinylsilane,
(diethylamino) dimethoxymethylvinylsilane,
(diethylamino)dimethoxyethylvinylsilane,
(diethylamino) diethoxymethylvinylsilane, and
(diethylamino)diethoxyethylvinylsilane.

Other examples are compounds in which two of $X^4$, $X^5$, and $X^6$ are acyclic amino groups represented by formula (XIVa) and one of $X^4$, $X^5$, and $X^6$ is a hydrocarbyl group or substituted hydrocarbyl group, e.g., bis(dialkylamino)alkylvinylsilanes, bis{di(trialkylsilyl)amino}alkylvinylsilanes, and bis(dialkylamino)alkoxyalkylvinylsilanes.

The bis(dialkylamino)alkylvinylsilane can be exemplified by
bis(dimethylamino)methylvinylsilane,
bis(ethylmethylamino)methylvinylsilane,
bis(diethylamino)methylvinylsilane,
bis(ethyl-n-propylamino)methylvinylsilane,
bis(ethylisopropylamino)methylvinylsilane,
bis(di(n-propyl)amino)methylvinylsilane,
bis(diisopropylamino)methylvinylsilane,
bis(n-butyl-n-propylamino)methylvinylsilane,
bis(di(n-butyl)amino)methylvinylsilane,
bis(dimethylamino)ethylvinylsilane,
bis(ethylmethylamino)ethylvinylsilane,
bis(diethylamino)ethylvinylsilane,
bis(ethyl-n-propylamino)ethylvinylsilane,
bis(ethylisopropylamino)ethylvinylsilane,
bis(di(n-propyl)amino)ethylvinylsilane,
bis(diisopropylamino)ethylvinylsilane,
bis(n-butyl-n-propylamino)ethylvinylsilane,
bis(di(n-butyl)amino)ethylvinylsilane,
bis(dimethylamino)propylvinylsilane,
bis(ethylmethylamino)propylvinylsilane,
bis(diethylamino)propylvinylsilane,
bis(ethyl-n-propylamino)propylvinylsilane,
bis(ethylisopropylamino)propylvinylsilane,
bis(di(n-propyl)amino)propylvinylsilane,
bis(diisopropylamino)propylvinylsilane,
bis(n-butyl-n-propylamino)propylvinylsilane,
bis(di(n-butyl)amino)propylvinylsilane,
bis(dimethylamino)butylvinylsilane,
bis(ethylmethylamino)butylvinylsilane,
bis(diethylamino)butylvinylsilane,
bis(ethyl-n-propylamino)butylvinylsilane,
bis(ethylisopropylamino)butylvinylsilane,
bis(di(n-propyl)amino)butylvinylsilane,
bis(diisopropylamino)butylvinylsilane,
bis(n-butyl-n-propylamino)butylvinylsilane, and
bis(di(n-butyl)amino)butylvinylsilane.

The bis{di(trialkylsilyl)amino}alkylvinylsilane can be exemplified by
bis{di(trimethylsilyl)amino}methylvinylsilane,
bis{di(t-butyldimethylsilyl)amino}methylvinylsilane,
bis{di(trimethylsilyl)amino}ethylvinylsilane, and
bis{di(t-butyldimethylsilyl)amino}ethylvinylsilane.

The bis(dialkylamino)alkoxyalkylvinylsilane can be exemplified by
bis(dimethylamino)methoxymethylvinylsilane,
bis(dimethylamino)methoxyethylvinylsilane,
bis(dimethylamino)ethoxymethylvinylsilane,
bis(dimethylamino)ethoxyethylvinylsilane,
bis(diethylamino)methoxymethylvinylsilane,
bis(diethylamino)methoxyethylvinylsilane,
bis(diethylamino)ethoxymethylvinylsilane, and
bis(diethylamino)ethoxyethylvinylsilane.

Additional examples are compounds in which the three of $X^4$, $X^5$, and $X^6$ are acyclic amino groups represented by formula (XIVa), such as tri(dialkylamino)vinylsilanes. Examples thereof include:
tri(dimethylamino)vinylsilane,
tri(ethylmethylamino)vinylsilane,
tri(diethylamino)vinylsilane,
tri(ethylpropylamino)vinylsilane,
tri(dipropylamino)vinylsilane, and
tri(butylpropylamino)vinylsilane.

Additional examples are compounds in which two of $X^4$, $X^5$, and $X^6$ are cyclic amino groups represented by formula (XIVa) and one of $X^4$, $X^5$, and $X^6$ is a hydrocarbyl group or substituted hydrocarbyl group, e.g.,
bis(morpholino)methylvinylsilane,
bis(piperidino)methylvinylsilane,
bis(4,5-dihydroimidazolyl)methylvinylsilane, and
bis(hexamethyleneimino)methylvinylsilane.

The vinyl compound represented by formula (XIV) in which two of $X^4$, $X^5$, and $X^6$ are groups represented by formula (XIVa) is preferably a vinyl compound in which two of $X^4$, $X^5$, and $X^6$ are acyclic amino groups, and, viewed in terms of the fuel economy, wet-grip performance, and abrasion resistance, is more preferably a bis(dialkylamino)alkylvinylsilane and even more preferably is bis(dimethylamino)methylvinylsilane, bis(diethylamino)methylvinylsilane, bis(di(n-propyl)amino)methylvinylsilane, or bis(di(n-butyl)amino)methylvinylsilane. Preferred among the preceding in terms of easy availability of the compound are bis(diethylamino)methylvinylsilane and bis(di(n-butyl)amino)methylvinylsilane.

In the solution polymerization, polymerization may be carried out by combining another monomer with the conjugated diene and vinyl compound of formula (XIV). The other monomer can be exemplified by aromatic vinyls, vinyl nitriles, and unsaturated carboxylic acid esters. The aromatic vinyl can be exemplified by styrene, α-methylstyrene, vinyltoluene, vinylnaphthalene, divinylbenzene, trivinylbenzene, and divinylnaphthalene. The vinyl nitrile can be exemplified by acrylonitrile, and the unsaturated carboxylic acid ester can be exemplified by methyl acrylate, ethyl acrylate, methyl methacrylate, and ethyl methacrylate. Aromatic vinyls are preferred among the preceding, and styrene is more preferred.

In the solution polymerization, polymerization may be carried out in the presence, for example, of an agent that adjusts the vinyl bond content of the conjugated diene unit or an agent that adjusts the distribution in the conjugated diene polymer chain of the conjugated diene unit and a constituent unit based on a monomer other than the conjugated diene (these agents are collectively referred to below as "regulators"). These agents can be exemplified by ether compounds, tertiary amines, and phosphine compounds. The ether compound can be exemplified by cyclic ethers such as tetrahydrofuran, tetrahydropyran, and 1,4-dioxane; aliphatic monoethers such as diethyl ether and dibutyl ether; aliphatic polyethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. The tertiary amine can be exemplified by triethylamine, tripropylamine, tributylamine, N,N,N',N'-tetramethylethylenediamine, N,N-diethylaniline, pyridine, and quinoline. The phosphine compound can be exemplified by trimethylphosphine, triethylphosphine, and triphenylphosphine. A single one of these may be used or two or more may be used in combination.

The polymerization temperature in solution polymerization is generally 25 to 100° C. and is preferably 35 to 90° C. 50 to 80° C. is more preferred. The polymerization time is generally 10 minutes to 5 hours.

The amount of modifying agent used in the step of modifying the polymer terminal is generally 0.1 to 3 moles, preferably 0.5 to 2 moles, and more preferably 0.7 to 1.5 moles, in each case per 1 mole of an alkali metal derived from the alkali metal catalyst.

The temperature in the modifying step is generally 25 to 100° C. and is preferably 35 to 90° C. and more preferably 50 to 80° C. The contact time is generally 60 seconds to 5 hours, preferably 5 minutes to 1 hour, and more preferably 15 minutes to 1 hour.

In the production method of the conjugated diene polymer, a coupling agent may be added to the hydrocarbon solution of the conjugated diene polymer as necessary from initiation of polymerization of monomers by the alkali metal catalyst to termination of polymerization. This coupling agent can be exemplified by compounds with the following formula (XV)

$$R^{54}{}_aML_{4-a} \qquad (XV)$$

(in the formula, $R^{54}$ represents an alkyl group, an alkenyl group, a cycloalkenyl group, or an aromatic residue; M represents a silicon atom or a tin atom; L represents a halogen atom or a hydrocarbyloxy group; and a is an integer from 0 to 2).

The term "aromatic residue" denotes a monovalent group provided by removing a hydrogen bonded to the aromatic ring from an aromatic hydrocarbon.

The coupling agent represented by formula (XV) can be exemplified by silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The amount of coupling agent, viewed from the perspective of the processability of the conjugated diene polymer, is preferably at least 0.03 mol and more preferably at least 0.05 mol, in each case per 1 mol of an alkali metal derived from the alkali metal catalyst. Viewed in terms of the fuel economy, it is preferably not more than 0.4 mol and more preferably not more than 0.3 mol.

The conjugated diene polymer can be recovered by known recovery methods from the hydrocarbon solution of the conjugated diene polymer, for example, by (1) the addition of a coagulant to the hydrocarbon solution of the conjugated diene polymer or (2) the addition of steam to the hydrocarbon solution of the conjugated diene polymer. The recovered conjugated diene polymer may be dried using a known drier, for example, a band drier or an extrusion drier.

A treatment in which the formula (Ia) group in the polymer is replaced by a hydroxyl group is preferably carried out, for example, by hydrolysis, in the production method of the conjugated diene polymer. This treatment may be carried out on the polymer by itself or on the composition thereof as described later. The hydrolysis method can be exemplified by known hydrolysis methods, e.g., methods using steam stripping. The treatment can convert $X^1$, $X^2$, and/or $X^3$ in formula (I) into hydroxyl groups and can thereby improve the fuel economy, wet-grip performance, and abrasion resistance in a more balanced manner.

The conjugated diene polymer can be used for the rubber component in the rubber composition of the present invention, and is preferably used in combination with, for example, other rubbers and additives.

The content of the conjugated diene polymer in 100% by mass of the rubber component is at least 5% by mass, preferably at least 8% by mass, and more preferably at least 10% by mass. A content of the conjugated diene polymer of less than 5% by mass tends to result in less improvement in the fuel economy. The content of the conjugated diene polymer is preferably not more than 50% by mass, more preferably not more than 45% by mass, and even more preferably not more than 40% by mass. A content of the conjugated diene polymer in excess of 50% by mass tends to result in a decline in the abrasion resistance and drive up the cost.

In addition to the conjugated diene polymer described in the preceding, the rubber composition of the present invention uses NR and ENR for the rubber component. This can improve the fuel economy, wet-grip performance, and abrasion resistance in good balance.

There are no particular limitations on the NR. For example, commonly used natural rubbers in the tire industry can be used, such as SIR20, RSS #3, TSR20, deproteinized natural rubber (DPNR), highly purified natural rubber (HPNR), and so forth.

The content of the NR in the rubber component taken to be 100% by mass is at least 5% by mass and preferably at least 7% by mass. The abrasion resistance exhibits a declining trend when the NR content is less than 5% by mass. The NR content is also not more than 50% by mass and preferably not more than 40% by mass. The wet-grip performance exhibits a declining trend when the NR content is more than 50% by mass.

There are no particular limitations on the ENR, and commercially available epoxidized natural rubbers can be used, or the ENR can be produced by the epoxidation of natural rubber (NR). The method of epoxidizing natural rubber is not particularly limited and can be exemplified by the chlorohydrin process, the direct oxidation process, the hydrogen peroxide process, the alkyl hydroperoxide process, the peracid process, and so forth.

The epoxidation degree of the ENR is preferably at least 12 mol % and more preferably at least 15 mol %. A satisfactory improvement in the wet-grip performance may not be obtained when the epoxidation degree is below 12 mol %. In addition, the ENR epoxidation degree is preferably not more than 80 mol % and more preferably not more than 60 mol %. When the epoxidation degree is above 80 mol %, gelation of the rubber component may appear and the rolling resistance also tends to be large.

The "epoxidation degree" denotes the average value of a percentage for the number of epoxidized carbon-carbon double bonds with reference to the total number of carbon-carbon double bonds in the natural rubber component prior to epoxidation, and may be determined, for example, by titrimetry or nuclear magnetic resonance (NMR) analysis.

The content of the ENR in the rubber component taken to be 100% by mass is at least 0.3% by mass, preferably at least 0.5% by mass, and more preferably at least 1% by mass. An improvement due to the ENR tends to be inadequate when the ENR content is less than 0.3% by mass.

In addition, the ENR content is not more than 10% by mass and preferably not more than 8% by mass. The abrasion resistance exhibits a declining tread when the ENR content is above 10% by mass.

The total content of the NR and ENR in the rubber component taken to be 100% by mass is preferably at least 5.5% by mass and more preferably at least 10% by mass. In addition, the total content is preferably not more than 60% by mass and more preferably not more than 50% by mass. The effects of the present invention are well manifested in the indicated range.

A rubber other than the previously described conjugated diene polymer, NR, and ENR may be used. This other rubber can be exemplified by heretofore known styrene-butadiene copolymer rubbers (SBR), polybutadiene rubbers (BR), butadiene-isoprene copolymer rubbers, and butyl rubbers. Additional examples of the rubber are ethylene-propylene copolymers and ethylene-octene copolymers. These rubbers may be used in combinations of two or more. Among the preceding, the use of BR and/or SBR is preferred because this can improve the fuel economy, wet-grip performance, and abrasion resistance in good balance; the use of both BR and SBR is more preferred.

There are no particular limitations on the BR, and commonly used BRs in the tire industry can be used, for example, high-cis BR such as BR1220 from Zeon Corporation and BR130B and BR150B from Ube Industries, Ltd., and BR containing syndiotactic polybutadiene crystals, such as VCR412 and VCR617 from Ube Industries, Ltd.

The content of the BR in the rubber component taken to be 100% by mass is preferably at least 5% by mass and more preferably at least 8% by mass. A trend of a declining abrasion resistance appears when the BR content is below 5% by mass. The BR content is preferably not more than 40% by mass and more preferably not more than 30% by mass. A trend of a declining wet-grip performance appears when the BR content is above 40% by mass.

There are no particular limitations on the SBR, and commonly used SBRs in the tire industry can be used, for example, emulsion polymerized styrene-butadiene rubber (E-SBR) and solution polymerized styrene-butadiene rubber (S-SBR). The styrene content in the SBR is preferably from 20 to 50% by mass and more preferably from 25 to 45% by mass.

From the standpoint of obtaining a satisfactory manifestation of the effects of the present invention, the SBR used is preferably a modified SBR in which terminal modification has been carried out using a modifying agent.

While there are no particular limitations on the modifying agent, the uses of the previously described modifying agents 1 to 5 are preferred from the standpoint of obtaining a satisfactory manifestation of the effects of the present invention, and the use of modifying agent 1 is more preferred.

The content of the SBR in the rubber component taken to be 100% by mass is preferably at least 10% by mass and more preferably at least 20% by mass. A trend of a declining wet-grip performance appears when the SBR content is less than 10% by mass. The SBR content is also preferably not more than 80% by mass and more preferably not more than 70% by mass. A trend of a declining abrasion resistance appears when the SBR content is above 80% by mass.

The rubber composition of the present invention characteristically incorporates carbon black and/or silica as a reinforcing agent. The rubber composition of the present invention, because it contains the previously described conjugated diene polymer, exhibits an excellent dispersion of the carbon black and silica and can thereby provide a well-balanced improvement in fuel economy, wet-grip performance, and abrasion resistance.

The carbon black can be exemplified by furnace blacks (furnace carbon blacks) such as SAF, ISAF, HAF, MAF, FEF, SRF, GPF, APF, FF, CF, SCF, and ECF; acetylene blacks (acetylene carbon blacks); thermal blacks (thermal carbon blacks) such as FT and MT; channel blacks (channel carbon blacks) such as EPC, MPC, and CC; and graphite. A single one of these may be used or two or more may be used in combination.

The nitrogen adsorption specific surface area ($N_2SA$) of the carbon black is generally 5 to 200 $m^2/g$, while a lower limit of 50 $m^2/g$ and an upper limit of 150 $m^2/g$ are preferred. The dibutyl phthalate (DBP) absorption of the carbon black is generally 5 to 300 mL/100 g, while a lower limit of 80 mL/100 g and an upper limit of 180 mL/100 g are preferred. When the carbon black has an $N_2SA$ or DBP absorption less than the lower limits on the indicated ranges, little reinforcing effect may be obtained and a trend of a declining abrasion resistance is seen. When the upper limits on the indicated ranges are exceeded, the dispersibility may be poor and the hysteresis loss tends to be increased, so that a trend of a declining fuel economy is seen. The nitrogen adsorption specific surface area is measured according to ASTM D4820-93, and the DBP absorption is measured according to ASTM D2414-93. Applicable commercial products are available under the trade names SEAST 6, SEAST 7HM, and SEAST KH from Tokai Carbon Co., Ltd., CK3 and Special Black 4A from Degussa, and so forth.

The carbon black content, expressed per 100 parts by mass of the rubber component, is preferably 3 to 100 parts by mass, more preferably 5 to 100 parts by mass, and even more preferably 5 to 40 parts by mass. The abrasion resistance tends to be unsatisfactory when the carbon black content is below 3 parts by mass, while the processability tends to deteriorate when the carbon black content is in excess of 100 parts by mass. A single carbon black may be used, or two or more may be used in combination.

Commonly used silicas in the tire industry, e.g., dry silica (anhydrous silica) and wet silica (hydrous silica), can be used as the silica. A single silica may be used or two or more may be used in combination.

The silica preferably has a nitrogen adsorption specific surface area ($N_2SA$) of 40 to 400 $m^2/g$ and more preferably of 60 to 360 $m^2/g$. When the silica has a nitrogen adsorption specific surface area of less than 40 $m^2/g$, little reinforcing effect may be obtained and a trend of a declining abrasion resistance is seen. For a silica that exceeds 400 $m^2/g$, the dispersibility may be poor and the hysteresis loss may be increased, so that a trend of a declining fuel economy is seen.

The nitrogen adsorption specific surface area of silica is a value measured by the BET method based on ASTM D3037-81.

The silica content, expressed per 100 parts by mass of the rubber component, is preferably 3 to 100 parts by mass and more preferably 5 to 100 parts by mass. The abrasion resistance tends to be unsatisfactory when the silica content is less than 3 parts by mass, while the processability tends to deteriorate when the silica content exceeds 100 parts by mass.

The total content of the carbon black and the silica, expressed per 100 parts by mass of the rubber component, is 3 to 100 parts by mass and preferably 5 to 100 parts by mass. The abrasion resistance tends to be unsatisfactory when the total content is less than 3 parts by mass, while the processability tends to deteriorate when the total content exceeds 100 parts by mass.

A silane coupling agent may also be used when the silica is incorporated. This silane coupling agent can be exemplified by
bis(3-triethoxysilylpropyl)tetrasulfide,
bis(3-triethoxysilylpropyl)trisulfide,
bis(3-triethoxysilylpropyl)disulfide,
bis(2-triethoxysilylethyl)tetrasulfide,
bis(3-trimethoxysilylpropyl)tetrasulfide,
bis(2-trimethoxysilylethyl)tetrasulfide,
3-mercaptopropyltrimethoxysilane,
3-mercaptopropyltriethoxysilane,
2-mercaptoethyltrimethoxysilane,
2-mercaptoethyltriethoxysilane,
3-trimethoxysilylpropyl-N,N-dimethylthiocarbamoyltetrasulfide,
3-triethoxysilylpropyl-N,N-dimethylthiocarbamoyltetrasulfide,
2-triethoxysilylethyl-N,N-dimethylthiocarbamoyltetrasulfide,
3-trimethoxysilylpropylbenzothiazole tetrasulfide,
3-triethoxysilylpropylbenzothiazolyltetrasulfide,
3-triethoxysilylpropyl methacrylate monosulfide,
3-trimethoxysilylpropyl methacrylate monosulfide,
bis(3-diethoxymethylsilylpropyl)tetrasulfide,
3-mercaptopropyldimethoxymethylsilane,
dimethoxymethylsilylpropyl-N,N-dimethylthiocarbamoyltetrasulfide, and
dimethoxymethylsilylpropylbenzothiazole tetrasulfide. Bis(3-triethoxysilylpropyl)tetrasulfide and 3-trimethoxysilylpropylbenzothiazolyltetrasulfide are preferred among the preceding, inter alia, from the standpoint of the reinforcing improvement effect. A single silane coupling agent may be used or two or more may be used in combination.

The amount of silane coupling agent, expressed per 100 parts by mass of the silica, is preferably at least 1 part by mass and more preferably at least 2 parts by mass. When the silane coupling agent is incorporated in an amount less than 1 part by mass, the unvulcanized rubber composition may assume a high viscosity and the processability tends to deteriorate. In addition, the amount of silane coupling agent, expressed per 100 parts by mass of the silica, is preferably not more than 20 parts by mass and more preferably not more than 15 parts by mass. When the silane coupling agent is incorporated in an amount in excess of 20 parts by mass, an effect of the silane coupling agent commensurate with its quantity of incorporation may not be obtained and high costs tend to be encountered.

Known additives can be used as the additives, for example, vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organoperoxides; fillers such as calcium carbonate, talc, alumina, clay, aluminum hydroxide, and mica; silane coupling agents; processing aids such as extender oils and lubricants; and antioxidants.

The extender oil can be exemplified by aromatic mineral oils (viscosity-gravity constant (VGC value)=0.900 to 1.049), naphthenic mineral oils (VGC value=0.850 to 0.899), and paraffinic mineral oils (VGC value=0.790 to 0.849). The polycyclic aromatic content of the extender oil is preferably less than 3% by mass and more preferably less than 1% by mass. The polycyclic aromatic content is measured based on British Institute of Petroleum method 346/92. In addition, the aromatic compound content (CA) of the extender oil is preferably at least 20% by mass. Combinations of two or more of these extender oils may be used.

The vulcanization accelerator can be exemplified by thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, di-ortho-tolylguanidine, and ortho-tolylguanidine. Its quantity of use, expressed per 100 parts by mass of the rubber component, is preferably 0.1 to 5 parts by mass and more preferably 0.2 to 3 parts by mass.

Known methods can be used to add the other rubbers, additives, and so forth, to the conjugated diene polymer to produce the rubber composition; for example, a method can be used in which the ingredients are mixed using a known mixer, e.g., a roll or Banbury mixer.

With regard to the mixing conditions during the incorporation of additives other than a vulcanizing agent or vulcanization accelerator, the mixing temperature is generally 50 to 200° C. and preferably 80 to 190° C., and the mixing time is generally 30 seconds to 30 minutes and preferably 1 to 30 minutes.

During the incorporation of a vulcanizing agent or vulcanization accelerator, the mixing temperature is generally not more than 100° C. and is preferably from room temperature to 80° C. The composition in which the vulcanizing agent and vulcanization accelerator have been incorporated is typically used after application thereto of a vulcanizing treatment, e.g., press vulcanization. The vulcanization temperature is generally 120 to 200° C. and preferably 140 to 180° C.

The rubber composition of the present invention exhibits an excellent balance among the fuel economy, wet-grip performance, and abrasion resistance and can provide a significant improvement in these properties.

The rubber composition of the present invention can be suitably used for various tire components and is particularly well suited for treads.

The pneumatic tire of the present invention can be produced by usual methods using the previously described rubber composition. Thus, the rubber composition, into which various additives have been incorporated as necessary, is extrusion processed in the unvulcanized stage into the shape of a tire tread and is molded by a usual method on a tire building machine and assembled with other tire components to form an unvulcanized tire. This unvulcanized tire is hot-pressed in a vulcanizer to produce a pneumatic tire according to the present invention.

The pneumatic tire of the present invention is suitably used as a tire for automobiles and trucks/buses (heavy-load tires).

EXAMPLES

The present invention is described in detail by the following examples.

The property evaluations were carried out using the following methods.

1. Vinyl Bond Content (Unit: Mol %) in Conjugated Diene Polymer

The vinyl bond content in the polymer was determined by infrared spectroscopic analysis from the strength of the absorption in the vicinity of 910 cm$^{-1}$, which is an absorption peak for a vinyl group.

2. Styrene Unit Content (Unit: % by Mass)

The styrene unit content in a polymer was determined from the refractive index according to JIS K6383 (1995).

3. Molecular Weight Distribution (Mw/Mn)

The weight-average molecular weight (Mw) and the number-average molecular weight (Mn) were measured by gel permeation chromatography (GPC) using the conditions (1) to (8) described below. The molecular weight distribution (Mw/Mn) of a polymer was determined from the measured Mw and Mn.

(1) instrument: HLC-8020 from Tosoh Corporation
(2) separation columns: 2×GMH-XL in series, from Tosoh Corporation
(3) measurement temperature: 40° C.
(4) carrier: tetrahydrofuran
(5) flow rate: 0.6 mL/minute
(6) quantity of introduction: 5 µL
(7) detector: differential refractometer
(8) molecular weight standards: polystyrene standards Tan δ

A strip-shaped test specimen (width 1 mm or 2 mm×length 40 mm) was punched from a sheet of the vulcanized rubber composition and this was submitted to testing. Using a spectrometer from Ueshima Seisakusho Co., Ltd., the tan δ was measured at a temperature of 50° C., a dynamic strain amplitude of 1%, and a frequency of 10 Hz. The value of the reciprocal of tan δ is given as an index assigning 100 to Comparative Example 1. A larger numerical value indicates a lower rolling resistance and thus better fuel economy.

5. Rolling Resistance

The rolling resistance was measured using a rolling resistance tester by running a test tire at a speed of 80 km/h, a load of 3.43 kN, and an internal pressure of 230 kPa on a 15×6JJ rim, and is reported as an index using Comparative Example 1 as 100. A larger index is better (better fuel economy).

6. Wet-grip Performance

Test tires were mounted on all the wheels of a vehicle (domestic FF 2000 cc) and the braking distance was determined from an initial speed of 100 km/h on a wet asphalt road surface. The results are given in index form with larger numbers indicating a better wet-skid performance (wet-grip performance). Indexing was performed using the following formula.

Wet-skid performance=(Braking distance in Comparative Example 1)/(Braking distance in the particular example or comparative example)×100

7. Abrasion Resistance

Test tires were run mounted on all the wheels of a vehicle (domestic FF 2000 cc), and the change in the pattern groove depth was determined pre-versus post-running for 30000 km. The results are given in index form with larger numbers indicating a better abrasion resistance.

Production Example 1

Synthesis of Polymer 1

The interior of a 20-L stainless steel polymerization reactor was washed and dried and substituted with dry nitrogen, and 10.2 kg hexane (specific gravity=0.68 g/cm$^3$), 547 g 1,3-butadiene, 173 g styrene, 6.1 mL tetrahydrofuran, and 5.0 mL ethylene glycol diethyl ether were introduced into the polymerization reactor. 11.1 mmol bis(diethylamino)methylvinylsilane and 13.1 mmol n-butyllithium were then introduced, as the cyclohexane solution and n-hexane solution, respectively, to initiate the polymerization.

Using a stirring rate of 130 rpm and a temperature within the polymerization reactor of 65° C., the 1,3-butadiene and styrene were copolymerized for 3 hours while continuously feeding monomers into the polymerization reactor. The amount of 1,3-butadiene fed over the whole polymerization was 821 g, and the amount of styrene fed was 259 g.

The resulting polymer solution was then stirred at a stirring rate of 130 rpm; 11.1 mmol [3-(diethylamino)propyl]triethoxysilane was added; and stirring was carried out for 15 minutes. 20 mL of a hexane solution containing 0.54 mL methanol was added to the polymer solution and the polymer solution was stirred for an additional 5 minutes.

1.8 g 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g pentaerythrityl tetrakis(3-laurylthiopropionate) (trade name: Sumilizer TP-D, from Sumitomo Chemical Co., Ltd.) were added to the polymer solution and polymer 1 was then recovered from the polymer solution by steam stripping. The evaluation results for polymer 1 are shown in Table 1. The content of a constituent unit of formula (I) in the polymer, as calculated from the amounts of raw materials introduced and the amounts of raw materials fed into the polymerization reactor, was 0.006 mmol/g-polymer (per unit mass of the polymer).

Production Example 2

Synthesis of Polymer 2

The interior of a 20-L stainless steel polymerization reactor was washed and dried and substituted with dry nitrogen, and 10.2 kg hexane (specific gravity=0.68 g/cm$^3$), 547 g 1,3-butadiene, 173 g styrene, 6.1 mL tetrahydrofuran, and 5.0 mL ethylene glycol diethyl ether were introduced into the polymerization reactor. 11.0 mmol bis(diethylamino)methylvinylsilane and 14.3 mmol n-butyllithium were then introduced, as the cyclohexane solution and n-hexane solution, respectively, to initiate the polymerization.

Using a stirring rate of 130 rpm and a temperature within the polymerization reactor of 65° C., the 1,3-butadiene and styrene were copolymerized for 3 hours while continuously feeding monomers into the polymerization reactor. The amount of 1,3-butadiene fed over the whole polymerization was 821 g, and the amount of styrene fed was 259 g.

The resulting polymer solution was then stirred at a stirring rate of 130 rpm; 11.0 mmol 1,3-dimethyl-2-imidazolidinone was added; and stirring was carried out for 15 minutes. 20 mL of a hexane solution containing 0.54 mL methanol was added to the polymer solution and the polymer solution was stirred for an additional 5 minutes.

1.8 g 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g pentaerythrityl tetrakis(3-laurylthiopropionate) (trade name: Sumilizer TP-D, from Sumitomo Chemical Co., Ltd.) were added to the polymer solution and polymer 2 was then recovered from the polymer solution by steam stripping. The evaluation results for polymer 2 are shown in Table 1. The content of a constituent unit of formula (I) in the polymer, as calculated from the amounts of raw materials introduced and the amounts of raw materials fed into the polymerization reactor, was 0.006 mmol/g-polymer (per unit mass of the polymer).

Production Example 3

Synthesis of Polymer 3

The interior of a 20-L stainless steel polymerization reactor was washed and dried and substituted with dry nitrogen, and 10.2 kg hexane (specific gravity=0.68 g/cm$^3$), 547 g 1,3-butadiene, 173 g styrene, 6.1 mL tetrahydrofuran, and 5.0 mL ethylene glycol diethyl ether were introduced into the polymerization reactor. 10.5 mmol bis(diethylamino)methylvinylsilane and 14.9 mmol n-butyllithium were then introduced, as the cyclohexane solution and n-hexane solution, respectively, to initiate the polymerization.

Using a stirring rate of 130 rpm and a temperature within the polymerization reactor of 65° C., the 1,3-butadiene and styrene were copolymerized for 3 hours while continuously feeding monomers into the polymerization reactor. The amount of 1,3-butadiene fed over the whole polymerization was 821 g, and the amount of styrene fed was 259 g.

The resulting polymer solution was then stirred at a stirring rate of 130 rpm; 10.5 mmol N-(3-dimethylaminopropyl)acrylamide was added; and stirring was carried out for 15 minutes. 20 mL of a hexane solution containing 0.54 mL methanol was added to the polymer solution and the polymer solution was stirred for an additional 5 minutes.

1.8 g 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g pentaerythrityl tetrakis(3-laurylthiopropionate) (trade name: Sumilizer TP-D, from Sumitomo Chemical Co., Ltd.) were added to the polymer solution and polymer 3 was then recovered from the polymer solution by steam stripping. The evaluation results for polymer 3 are shown in Table 1. The content of a constituent unit of formula (I) in the polymer, as calculated from the amounts of raw materials introduced and the amounts of raw materials fed into the polymerization reactor, was 0.006 mmol/g-polymer (per unit mass of the polymer).

Production Example 4

Synthesis of Polymer 4

The interior of a 20-L stainless steel polymerization reactor was washed and dried and substituted with dry nitrogen, and 10.2 kg hexane (specific gravity=0.68 g/cm$^3$), 547 g 1,3-butadiene, 173 g styrene, 6.1 mL tetrahydrofuran, and 5.0 mL ethylene glycol diethyl ether were introduced into the polymerization reactor. 16.0 mmol bis(diethylamino)methylvinylsilane and 18.5 mmol n-butyllithium were then introduced, as the cyclohexane solution and n-hexane solution, respectively, to initiate the polymerization.

Using a stirring rate of 130 rpm and a temperature within the polymerization reactor of 65° C., the 1,3-butadiene and styrene were copolymerized for 3 hours while continuously feeding monomers into the polymerization reactor. The amount of 1,3-butadiene fed over the whole polymerization was 821 g, and the amount of styrene fed was 259 g.

The resulting polymer solution was then stirred at a stirring rate of 130 rpm; 4.0 mmol 1,3,5-tris(3-trimethoxysilylpropyl)isocyanurate was added; and stirring was carried out for 15 minutes. 20 mL of a hexane solution containing 0.80 mL methanol was added to the polymer solution and the polymer solution was stirred for an additional 5 minutes.

1.8 g 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g pentaerythrityl tetrakis(3-laurylthiopropionate) (trade name: Sumilizer TP-D, from Sumitomo Chemical Co., Ltd.) were added to the polymer solution and polymer 4 was then recovered from the polymer solution by steam stripping. The evaluation results for polymer 4 are shown in Table 1. The content of a constituent unit of formula (I) in the polymer, as calculated from the amounts of raw materials introduced and the amounts of raw materials fed into the polymerization reactor, was 0.009 mmol/g-polymer (per unit mass of the polymer).

Production Example 5

Synthesis of Polymer 5

The interior of a 20-L stainless steel polymerization reactor was washed and dried and substituted with dry nitrogen, and 10.2 kg hexane (specific gravity=0.68 g/cm³), 547 g 1,3-butadiene, 173 g styrene, 6.1 mL tetrahydrofuran, and 5.0 mL ethylene glycol diethyl ether were introduced into the polymerization reactor. 11.5 mmol bis(diethylamino)methylvinylsilane and 14.1 mmol n-butyllithium were then introduced, as the cyclohexane solution and n-hexane solution, respectively, to initiate the polymerization.

Using a stirring rate of 130 rpm and a temperature within the polymerization reactor of 65° C., the 1,3-butadiene and styrene were copolymerized for 3 hours while continuously feeding monomers into the polymerization reactor. The amount of 1,3-butadiene fed over the whole polymerization was 821 g, and the amount of styrene fed was 259 g.

The resulting polymer solution was then stirred at a stirring rate of 130 rpm; 11.5 mmol N,N-dimethylformamide dimethyl acetal was added; and stirring was carried out for 15 minutes. 20 mL of a hexane solution containing 0.54 mL methanol was added to the polymer solution and the polymer solution was stirred for an additional 5 minutes.

1.8 g 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g pentaerythrityl tetrakis(3-laurylthiopropionate) (trade name: Sumilizer TP-D, from Sumitomo Chemical Co., Ltd.) were added to the polymer solution and polymer 5 was then recovered from the polymer solution by steam stripping. The evaluation results for polymer 5 are shown in Table 1. The content of a constituent unit of formula (I) in the polymer, as calculated from the amounts of raw materials introduced and the amounts of raw materials fed into the polymerization reactor, was 0.006 mmol/g-polymer (per unit mass of the polymer).

Production Example 6

Synthesis of Polymer 6

The interior of a 5-L stainless steel polymerization reactor was washed and dried and substituted with dry nitrogen, and 2.55 kg hexane (specific gravity=0.68 g/cm³), 137 g 1,3-butadiene, 43 g styrene, 1.0 mL tetrahydrofuran, and 1.0 mL ethylene glycol diethyl ether were introduced into the polymerization reactor. 3.6 mmol n-butyllithium was then introduced as the n-hexane solution and the 1,3-butadiene and styrene were copolymerized for 2.5 hours. During the polymerization, the stirring rate was 130 rpm; the temperature within the polymerization reactor was 65° C.; and monomers were continuously fed into the polymerization reactor. The amount of 1,3-butadiene fed was 169 g, and the amount of styrene fed was 101 g.

After the polymerization for 2.5 hours, 11.1 mmol [3-(diethylamino)propyl]triethoxysilane was introduced as the cyclohexane solution into the polymerization reactor at a stirring rate of 130 rpm and a temperature within the polymerization reactor of 65° C. and stirring was carried out for 30 minutes.

20 mL of a hexane solution containing 0.14 mL methanol was then introduced into the polymerization reactor and the polymer solution was stirred for 5 minutes.

1.8 g 2-tert-butyl-6-(3-tert-butyl-2-hydroxy-5-methylbenzyl)-4-methylphenyl acrylate (trade name: Sumilizer GM, from Sumitomo Chemical Co., Ltd.) and 0.9 g pentaerythrityl tetrakis(3-laurylthiopropionate) (trade name: Sumilizer TP-D, from Sumitomo Chemical Co., Ltd.) were added to the polymer solution and polymer 6 was then recovered from the polymer solution by steam stripping. The evaluation results for polymer 6 are shown in Table 1.

Production Examples 7-11

Syntheses of Polymers 7-11

Polymers 7-11 were produced in the same manner as in the syntheses of polymers 1-5 except that bis(di(n-butyl)amino)methylvinylsilane (11.1 mmol) was used in place of bis(diethylamino)methylvinylsilane (11.1 mmol). The evaluation results for polymers 7-11 are shown in Table 1.

Production Examples 12-21

Syntheses of Polymers 12-21

Polymers 12-21 were produced in the same manner as in the syntheses of polymers 1-5 and polymers 7-11 except that the polymer solution was evaporated at room temperature for 24 hours and then dried under reduced pressure at 55° C. for 12 hours, instead of the steam stripping. The evaluation results for polymers 12-21 are shown in Table 2.

TABLE 1

| | Polymers | | | | | | | | | | |
|---|---|---|---|---|---|---|---|---|---|---|---|
| | 1 | 2 | 3 | 4 | 5 | 6 | 7 | 8 | 9 | 10 | 11 |
| Styrene unit content (% by mass) | 25 | 24 | 24 | 25 | 25 | 33 | 24 | 23 | 25 | 23 | 24 |
| Vinyl bond content (mol %) | 59 | 60 | 58 | 59 | 59 | 42 | 60 | 59 | 59 | 60 | 58 |
| Molecular weight distribution (Mw/Mn) | 1.2 | 1.2 | 1.3 | 1.3 | 1.2 | 1.1 | 1.2 | 1.2 | 1.2 | 1.3 | 1.2 |

TABLE 2

| | Polymers | | | | | | | | | |
|---|---|---|---|---|---|---|---|---|---|---|
| | 12 | 13 | 14 | 15 | 16 | 17 | 18 | 19 | 20 | 21 |
| Styrene unit content (% by mass) | 25 | 24 | 24 | 25 | 25 | 24 | 23 | 25 | 23 | 24 |
| Vinyl bond content (mol %) | 59 | 60 | 58 | 59 | 59 | 60 | 59 | 59 | 60 | 58 |
| Molecular weight distribution (Mw/Mn) | 1.2 | 1.2 | 1.3 | 1.3 | 1.2 | 1.2 | 1.2 | 1.2 | 1.3 | 1.2 |

The various chemicals used in the examples and comparative examples are described below.

Natural rubber: RSS #3
Epoxidized natural rubber 1: ENR25 (epoxidation degree: 25 mol %) from Kumpulan Guthrie Berhad
Epoxidized natural rubber 2: ENR50 (epoxidation degree: 50 mol %) from Kumpulan Guthrie Berhad
Butadiene rubber: Ubepol BR150B from Ube Industries, Ltd.
Polymers 1 to 21: see Production Examples 1 to 21 above
Silica: Ultrasil VN3-G ($N_2SA$: 175 $m^2$/g) from Degussa
Silane coupling agent: Si69 (bis(3-triethoxysilylpropyl)tetrasulfide) from Degussa
Carbon black: Diablack N339 ($N_2SA$: 96 $m^2$/g, DBP absorption: 124 mL/100 g) from Mitsubishi Chemical Corporation
Oil: X-140 from Japan Energy Corporation
Antioxidant: Antigene 3C from Sumitomo Chemical Co., Ltd.
Stearic acid: Tsubaki stearic acid beads, from NOF Corporation
Zinc oxide: zinc white #1, from Mitsui Mining & Smelting Co., Ltd.
Wax: Sannoc N from Ouchi Shinko Chemical Industrial Co., Ltd.
Sulfur: sulfur powder from Tsurumi Chemical Industry Co., Ltd.
Vulcanization accelerator 1: Soxinol CZ from Sumitomo Chemical Co., Ltd.
Vulcanization accelerator 2: Soxinol D from Sumitomo Chemical Co., Ltd.

Examples 1 to 25 and Comparative Examples 1 to 3

Using the compounding recipes shown in Tables 3 and 4, the materials other than the sulfur and vulcanization accelerators were mixed for 5 minutes at 150° C. using a 1.7-L Banbury mixer from Kobe Steel, Ltd., to obtain a kneadate. The sulfur and vulcanization accelerators were then added to the obtained kneadate and kneading was performed using an open roll for 5 minutes at 80° C. to obtain an unvulcanized rubber composition. The obtained unvulcanized rubber composition was press-vulcanized for 20 minutes at 170° C. using a 0.5 mm-thick mold to obtain a vulcanized rubber composition.

In addition, the unvulcanized rubber composition was molded into a tread shape and assembled with the other tire components on a tire building machine to form an unvulcanized tire. The unvulcanized tire was vulcanized for 12 minutes at 170° C. to produce a test tire (size: 195/65R15).

The evaluations by the previously described test methods were carried out on the obtained vulcanized rubber compositions and test tires. The results of these tests are shown in Tables 3 and 4.

TABLE 3

| | | Examples | | | | | | | | | | Comparative Examples | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Components (part(s) by mass) | Natural rubber | 13 | 14.5 | 10 | 13 | 13 | 13 | 13 | 13 | 14.5 | 10 | 15 | 13 | 15 |
| | Epoxidized natural rubber 1 | 2 | 0.5 | 5 | 2 | 2 | 2 | 2 | — | — | — | — | 2 | — |
| | Epoxidized natural rubber 2 | — | — | — | — | — | — | — | 2 | 0.5 | 5 | — | — | — |
| | Butadiene rubber | 20 | 20 | 20 | 20 | 20 | 20 | 20 | 20 | 20 | 20 | 20 | 20 | 20 |
| | Polymer 1 | 10 | 10 | 10 | — | — | — | — | 10 | 10 | 10 | — | — | 10 |
| | Polymer 2 | — | — | — | 10 | — | — | — | — | — | — | — | — | — |
| | Polymer 3 | — | — | — | — | 10 | — | — | — | — | — | — | — | — |
| | Polymer 4 | — | — | — | — | — | 10 | — | — | — | — | — | — | — |
| | Polymer 5 | — | — | — | — | — | — | 10 | — | — | — | — | — | — |
| | Polymer 6 | 55 | 55 | 55 | 55 | 55 | 55 | 55 | 55 | 55 | 55 | 65 | 65 | 55 |
| | Silica | 70 | 70 | 70 | 70 | 70 | 70 | 70 | 70 | 70 | 70 | 70 | 70 | 70 |
| | Silane coupling agent | 5.6 | 5.6 | 5.6 | 5.6 | 5.6 | 5.6 | 5.6 | 5.6 | 5.6 | 5.6 | 5.6 | 5.6 | 5.6 |
| | Carbon black | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 |
| | Antioxidant | 2.5 | 1.5 | 1.5 | 1.5 | 1.5 | 1.5 | 1.5 | 2.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 |
| | Zinc oxide | 3 | 2.5 | 2.5 | 2.5 | 2.5 | 2.5 | 2.5 | 3 | 2.5 | 2.5 | 2.5 | 2.5 | 2.5 |
| | Wax | 2 | 2 | 2 | 2 | 2 | 2 | 2 | 2 | 2 | 2 | 2 | 2 | 2 |
| | Sulfur | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Tanδ index | 106 | 106 | 105 | 106 | 105 | 105 | 104 | 107 | 106 | 106 | 100 | 99 | 103 |
| | Rolling resistance index | 104 | 104 | 104 | 104 | 103 | 104 | 104 | 104 | 104 | 104 | 100 | 100 | 102 |
| | Wet-grip performance index | 108 | 107 | 111 | 107 | 108 | 107 | 109 | 109 | 107 | 112 | 100 | 102 | 103 |
| | Abrasion resistance index | 101 | 100 | 100 | 101 | 100 | 101 | 101 | 101 | 100 | 100 | 100 | 100 | 100 |

TABLE 4

| | | Examples | | | | | | | | | | | | | | |
|---|---|---|---|---|---|---|---|---|---|---|---|---|---|---|---|---|
| | | 11 | 12 | 13 | 14 | 15 | 16 | 17 | 18 | 19 | 20 | 21 | 22 | 23 | 24 | 25 |
| Components (part(s) by mass) | Natural rubber | 13 | 13 | 13 | 13 | 13 | 13 | 13 | 13 | 13 | 13 | 13 | 13 | 13 | 13 | 13 |
| | Epoxidized natural rubber 1 | 2 | 2 | 2 | 2 | 2 | 2 | 2 | 2 | 2 | 2 | 2 | 2 | 2 | 2 | 2 |
| | Butadiene rubber | 20 | 20 | 20 | 20 | 20 | 20 | 20 | 20 | 20 | 20 | 20 | 20 | 20 | 20 | 20 |
| | Polymer 6 | 55 | 55 | 55 | 55 | 55 | 55 | 55 | 55 | 55 | 55 | 55 | 55 | 55 | 55 | 55 |
| | Polymer 7 | 10 | — | — | — | — | — | — | — | — | — | — | — | — | — | — |
| | Polymer 8 | — | 10 | — | — | — | — | — | — | — | — | — | — | — | — | — |
| | Polymer 9 | — | — | 10 | — | — | — | — | — | — | — | — | — | — | — | — |

TABLE 4-continued

| | | Examples | | | | | | | | | | | | | | |
|---|---|---|---|---|---|---|---|---|---|---|---|---|---|---|---|---|
| | | 11 | 12 | 13 | 14 | 15 | 16 | 17 | 18 | 19 | 20 | 21 | 22 | 23 | 24 | 25 |
| | Polymer 10 | — | — | — | 10 | — | — | — | — | — | — | — | — | — | — | — |
| | Polymer 11 | — | — | — | — | 10 | — | — | — | — | — | — | — | — | — | — |
| | Polymer 12 | — | — | — | — | — | 10 | — | — | — | — | — | — | — | — | — |
| | Polymer 13 | — | — | — | — | — | — | 10 | — | — | — | — | — | — | — | — |
| | Polymer 14 | — | — | — | — | — | — | — | 10 | — | — | — | — | — | — | — |
| | Polymer 15 | — | — | — | — | — | — | — | — | 10 | — | — | — | — | — | — |
| | Polymer 16 | — | — | — | — | — | — | — | — | — | 10 | — | — | — | — | — |
| | Polymer 17 | — | — | — | — | — | — | — | — | — | — | 10 | — | — | — | — |
| | Polymer 18 | — | — | — | — | — | — | — | — | — | — | — | 10 | — | — | — |
| | Polymer 19 | — | — | — | — | — | — | — | — | — | — | — | — | 10 | — | — |
| | Polymer 20 | — | — | — | — | — | — | — | — | — | — | — | — | — | 10 | — |
| | Polymer 21 | — | — | — | — | — | — | — | — | — | — | — | — | — | — | 10 |
| | Silica | 70 | 70 | 70 | 70 | 70 | 70 | 70 | 70 | 70 | 70 | 70 | 70 | 70 | 70 | 70 |
| | Silane coupling agent | 5.6 | 5.6 | 5.6 | 5.6 | 5.6 | 5.6 | 5.6 | 5.6 | 5.6 | 5.6 | 5.6 | 5.6 | 5.6 | 5.6 | 5.6 |
| | Carbon black | 5 | 5 | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 | 20 | 20 |
| | Antioxidant | 2.5 | 1.5 | 1.5 | 1.5 | 1.5 | 1.5 | 1.5 | 2.5 | 2.5 | 2.5 | 2.5 | 2.5 | 2.5 | 2.5 | 2.5 |
| | Stearic acid | 2 | 2 | 2 | 2 | 2 | 2 | 2 | 2 | 2 | 2 | 2 | 2 | 2 | 2 | 2 |
| | Zinc oxide | 3 | 2.5 | 2.5 | 2.5 | 2.5 | 2.5 | 2.5 | 3 | 3 | 3 | 3 | 3 | 3 | 3 | 3 |
| | Wax | 2 | 2 | 2 | 2 | 2 | 2 | 2 | 2 | 2 | 2 | 2 | 2 | 2 | 2 | 2 |
| | Sulfur | 2 | 2 | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Tanδ index | 105 | 105 | 104 | 104 | 103 | 104 | 105 | 104 | 104 | 104 | 103 | 103 | 104 | 102 | 104 |
| | Rolling resistance index | 103 | 104 | 103 | 102 | 104 | 102 | 103 | 103 | 103 | 102 | 100 | 101 | 104 | 103 | 101 |
| | Wet-grip performance index | 107 | 107 | 107 | 105 | 109 | 106 | 105 | 106 | 105 | 108 | 104 | 104 | 105 | 102 | 106 |
| | Abrasion resistance index | 101 | 101 | 103 | 101 | 100 | 100 | 101 | 102 | 100 | 100 | 100 | 101 | 102 | 100 | 103 |

As is shown in Tables 3 and 4, the rubber compositions according to the examples, which contained NR, ENR, and a terminal-modified polymer (polymers 1 to 5 and polymers 7-21) that had a conjugated diene-based constituent unit and a constituent unit of formula (I), exhibited a well-balanced improvement in fuel economy, wet-grip performance, and abrasion resistance compared to the rubber compositions of the comparative examples.

The invention claimed is:

1. A pneumatic tire produced using a rubber composition containing a rubber component, and carbon black, silica, or carbon black and silica, wherein based on 100% by mass of the rubber component, the rubber component contains 7 to 40% by mass of natural rubber, 1 to 10% by mass of an epoxidized natural rubber, 8 to 30% by mass of polybutadiene rubber, 20 to 70% by mass of a styrene-butadiene copolymer rubber, and 5 to 40% by mass of a conjugated diene polymer that has a constituent unit based on a conjugated diene and a constituent unit represented by formula (I) below:

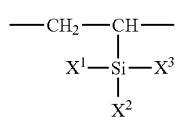

(I)

wherein, $X^1$, $X^2$, and $X^3$ each independently represent a hydroxyl group or a $C_{1-4}$ alkyl group at least one terminal of the conjugated diene polymer chain being modified by a compound selected from the group consisting of compounds of formula (II)

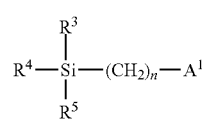

(II)

wherein n is an integer from 1 to 10, $R^3$, $R^4$, and $R^5$ are each independently a $C_{1-3}$ alkyl group or a $C_{1-3}$ alkoxy group, provided that at least one of $R^3$, $R^4$, and $R^5$ is an alkoxy group, and $A^1$ is a dialkylamino group, a di(alkoxyalkyl)amino group, a di(alkylene oxide)amino group, a di(alkylene oxide alkyl)amino group, or a di(trialkylsilyl) amino group;

compounds of formula (Va)

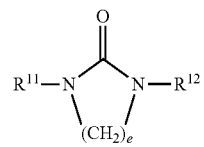

(Va)

wherein e represents an integer from 2 to 7 and $R^{11}$ and $R^{12}$ each independently represents a $C_{1-20}$ alkyl group;

compounds of formula (VII):

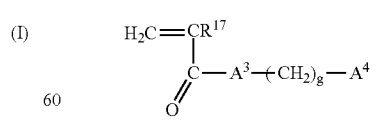

(VII)

wherein g represents an integer from 1 to 10, $R^{17}$ is a hydrogen atom, a $C_{1-4}$ alkyl group, or a $C_{1-4}$ alkoxy group, $A^3$ is the group —$NR^{18}$— wherein $R^{18}$ is a hydrogen atom or a $C_{1-4}$ alkyl group, and $A^4$ is a dialkylamino group, a di(alkylene oxide)amino group, a di(alkylene oxide alkyl)amino group, or a di(trialkylsilyl)amino group;

compounds of formula (IXc)

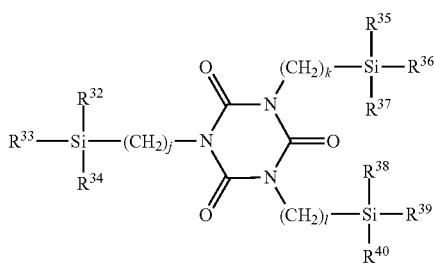

wherein j, k, and 1 each independently represents an integer from 1 to 10, $R^{32}$ to $R^{40}$ each independently represents a $C_{1-3}$ alkyl group or a $C_{1-3}$ alkoxy group, at least one of $R^{32}$, $R^{33}$, and $R^{34}$ is an alkoxy group, at least one of $R^{35}$, $R^{36}$, and $R^{37}$ is an alkoxy group, and at least one of $R^{38}$, $R^{39}$, and $R^{40}$ is an alkoxy group; and compounds of formula (XIII)

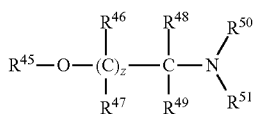

wherein z represents an integer from 0 to 10, $R^{45}$ represents a $C_{1-4}$ alkyl group, $R^{46}$, $R^{47}$, $R^{48}$, and $R^{49}$ each independently represents a hydrogen atom or a $C_{1-4}$ alkyl group, or a $C_{1-3}$ alkoxy group, provided that when a plurality of $R^{46}$'s are present, the plurality of $R^{46}$'s may be the same as each other or may differ from one another, and when a plurality of $R^{47}$'s are present, the plurality of $R^{47}$'s may be the same as each other or may differ from one another, and $R^{50}$ and $R^{51}$ each independently represents a $C_{1-4}$ alkyl group, wherein terminal modification of the styrene-butadiene copolymer rubber has been carried out with a compound selected from the group consisting of compounds of formula (II), compounds of formula (Va), compounds of formula (VII), compounds of formula (IXc), and compounds of formula (XIII), and wherein a total content of any carbon black and/or silica in said rubber composition is 5 to 100 parts by mass per 100 parts by mass of said rubber component.

2. The pneumatic tire produced using the rubber composition according to claim 1, wherein two of $X^1$, $X^2$, and $X^3$ in formula (I) are hydroxyl groups.

3. The pneumatic tire produced using the rubber composition according to claim 1, wherein a vinyl bond content in the conjugated diene polymer is from at least 10 mol % to not more than 80 mol % per 100 mol % of the constituent unit based on a conjugated diene.

* * * * *